United States Patent
Shibata et al.

(10) Patent No.: US 7,249,271 B2
(45) Date of Patent: Jul. 24, 2007

(54) DATA TRANSFER CONTROL DEVICE AND ELECTRONIC INSTRUMENT

(75) Inventors: Yukinari Shibata, Sapporo (JP);
Nobuyuki Saito, Sapporo (JP);
Tomonaga Hasegawa, Sapporo (JP);
Takuya Ishida, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 442 days.

(21) Appl. No.: 10/934,461

(22) Filed: Sep. 7, 2004

(65) Prior Publication Data

US 2005/0066077 A1    Mar. 24, 2005

(30) Foreign Application Priority Data

| Sep. 5, 2003 | (JP) | 2003-314055 |
| Sep. 5, 2003 | (JP) | 2003-314056 |
| Jan. 22, 2004 | (JP) | 2004-014412 |
| Jan. 22, 2004 | (JP) | 2004-014413 |
| Mar. 9, 2004 | (JP) | 2004-065937 |

(51) Int. Cl.
*G06F 1/26* (2006.01)
*G06F 1/32* (2006.01)
*H04B 1/10* (2006.01)
*H04B 1/04* (2006.01)
*H04B 1/38* (2006.01)

(52) U.S. Cl. ............... 713/324; 713/300; 713/320; 713/322; 713/323; 455/127.1; 455/127.5; 455/343.5; 455/522; 455/574

(58) Field of Classification Search .................. None
See application file for complete search history.

(56) References Cited

U.S. PATENT DOCUMENTS 5,512,853 A    4/1996    Ueno et al.

| 5,717,871 A | 2/1998 | Hsieh et al. |
| 6,611,157 B2 | 8/2003 | Usui |
| 6,865,168 B1* | 3/2005 | Sekine ............ 370/335 |

(Continued)

FOREIGN PATENT DOCUMENTS

EP    0 671 693 A1    9/1995

(Continued)

OTHER PUBLICATIONS

U.S. Appl. No. 10/934,529, filed Sep. 7, 2004, Shibata et al.

(Continued)

*Primary Examiner*—James K. Trujillo
(74) *Attorney, Agent, or Firm*—Oliff & Berridge, PLC

(57) ABSTRACT

A data transfer control device includes an OUT-transfer transmitter circuit which transmits OUT data by driving a serial signal line, a clock-transfer transmitter circuit which transmits a clock signal CLK by driving a serial signal line, a PLL circuit which generates the clock signal CLK, and a power-down setting circuit which sets a power-down mode. In a first power-down mode, the OUT-transfer transmitter circuit is set to the power-down mode, and the clock-transfer transmitter circuit is set to the power-down mode to stop a system clock signal of a target-side data transfer control device. In a second power-down mode, the OUT-transfer transmitter circuit is set to the power-down mode without setting the clock-transfer transmitter circuit to the power-down mode.

13 Claims, 21 Drawing Sheets

U.S. PATENT DOCUMENTS

| | | | |
|---|---|---|---|
| 7,003,277 B2 * | 2/2006 | Toshida | 455/343.1 |
| 7,020,208 B1 * | 3/2006 | Yen | 375/244 |
| 2004/0042541 A1 * | 3/2004 | Matsumura | 375/219 |
| 2004/0128595 A1 * | 7/2004 | Schoenborn et al. | 714/724 |

FOREIGN PATENT DOCUMENTS

| | | |
|---|---|---|
| EP | 1 313 257 A1 | 5/2003 |
| JP | A 06-113364 | 4/1994 |
| JP | A 06-132968 | 5/1994 |
| JP | A 7-245559 | 9/1995 |
| JP | A 07-264042 | 10/1995 |
| JP | A 08-125695 | 5/1996 |
| JP | A 08-162942 | 6/1996 |
| JP | A 10-300829 | 11/1998 |
| JP | A 2002-314397 | 10/2002 |
| JP | A 2003-218843 | 7/2003 |

OTHER PUBLICATIONS

U.S. Appl. No. 10/934,518, filed Sep. 7, 2004, Shibata et al.
U.S. Appl. No. 10/164,374, filed Jun. 10, 2002, Sugita.

* cited by examiner

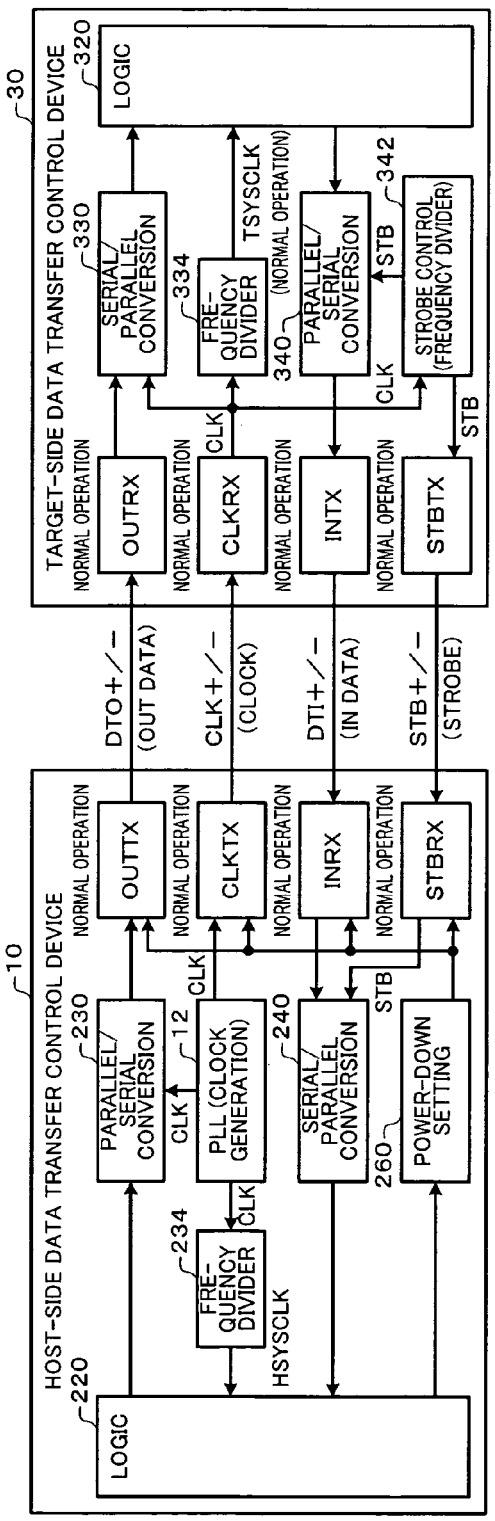
FIG. 2A NORMAL OPERATION
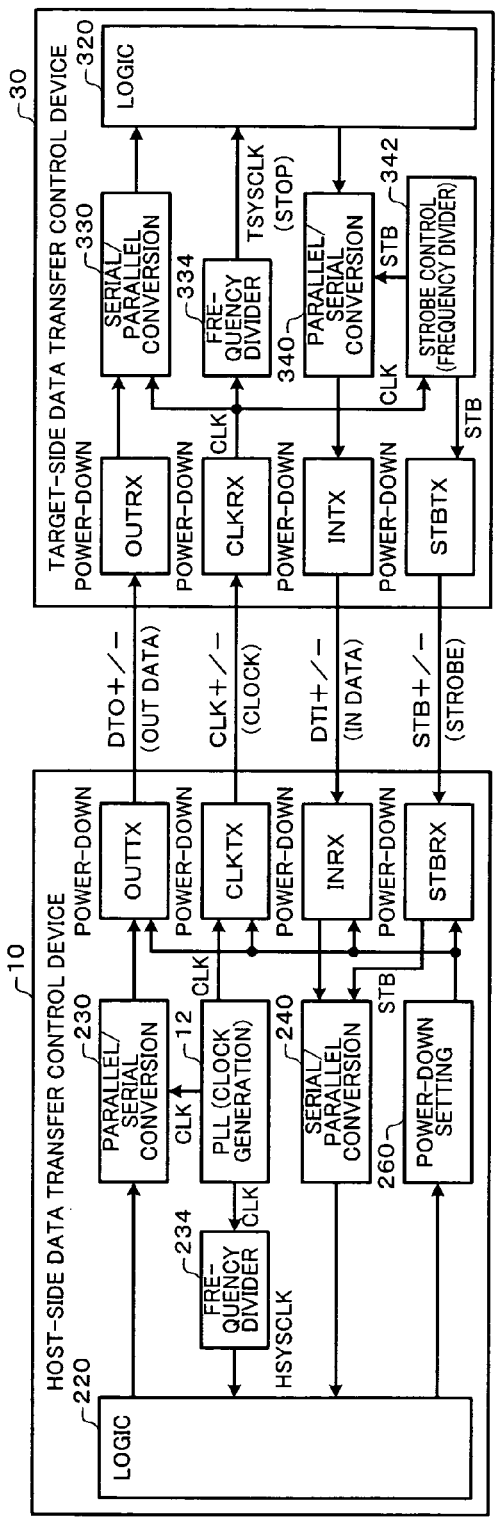
FIG. 2B POWER-DOWN MODE M1

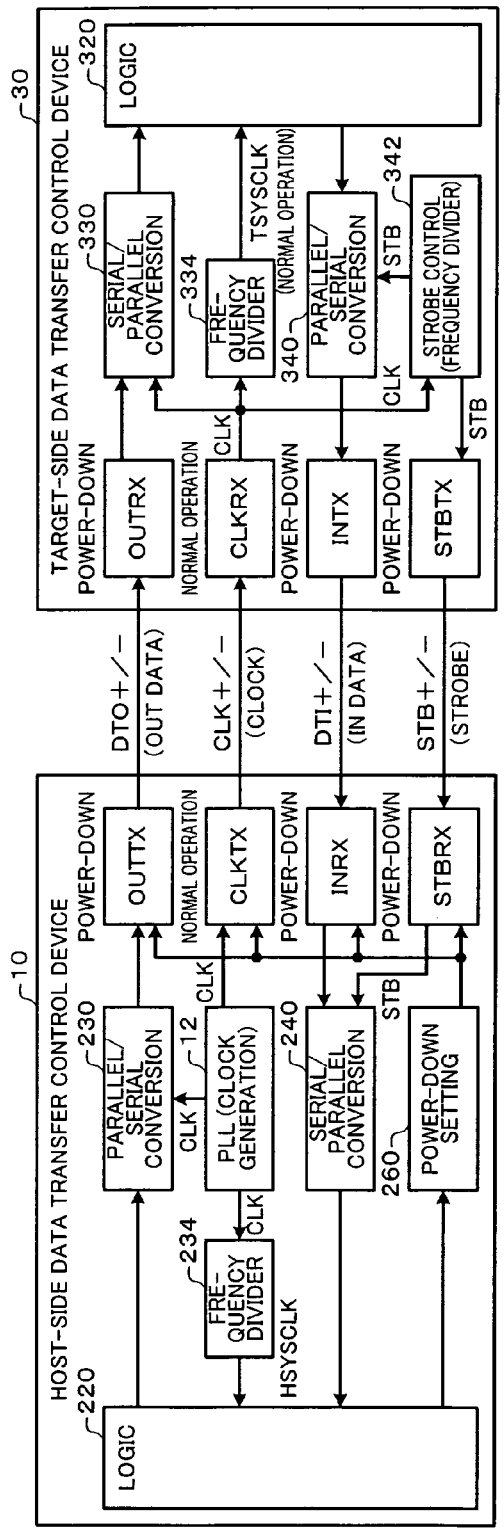
FIG. 3A  POWER-DOWN MODE M2
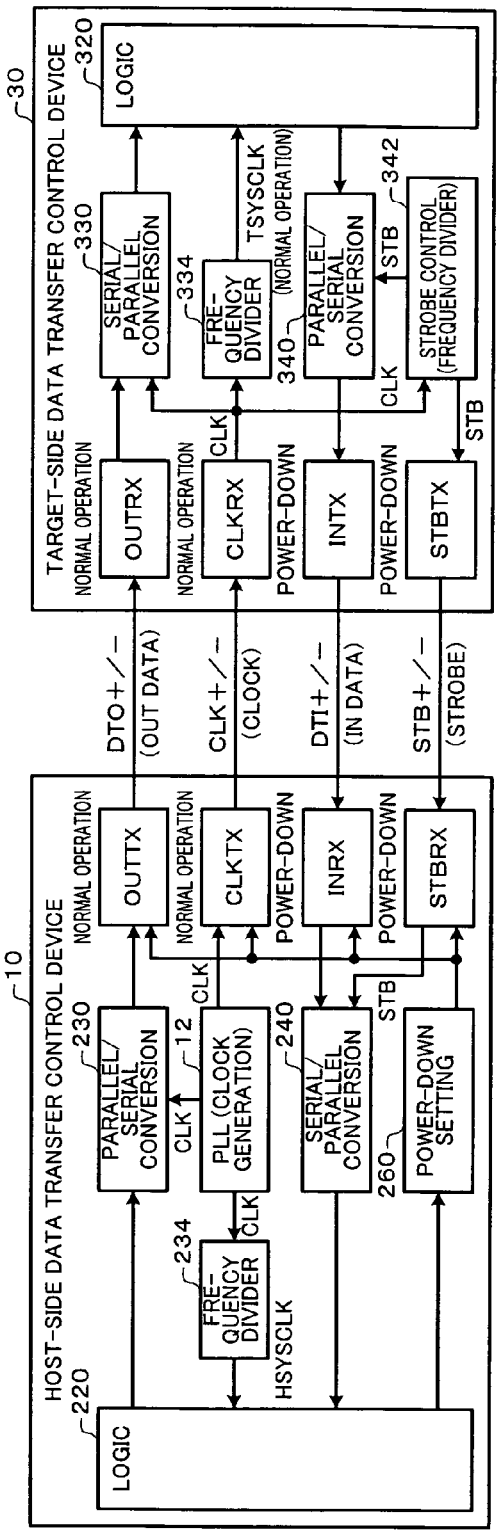
FIG. 3B  POWER-DOWN MODE M3

FIG. 4

| POWER-DOWN MODE | OUTTX | CLKTX | INRX | STBRX |
|---|---|---|---|---|
| M1 | POWER-DOWN | POWER-DOWN (TARGET-SIDE SYSTEM CLOCK STOPS) | POWER-DOWN | POWER-DOWN |
| M2 | POWER-DOWN | NORMAL OPERATION (TARGET-SIDE SYSTEM CLOCK IS IN NORMAL OPERATION) | POWER-DOWN | POWER-DOWN |
| M3 | NORMAL OPERATION | NORMAL OPERATION (TARGET-SIDE SYSTEM CLOCK IS IN NORMAL OPERATION) | POWER-DOWN | POWER-DOWN |
| M4 | AUTOMATIC POWER-DOWN | NORMAL OPERATION (TARGET-SIDE SYSTEM CLOCK IS IN NORMAL OPERATION) | AUTOMATIC POWER-DOWN | AUTOMATIC POWER-DOWN |

FIG. 12A
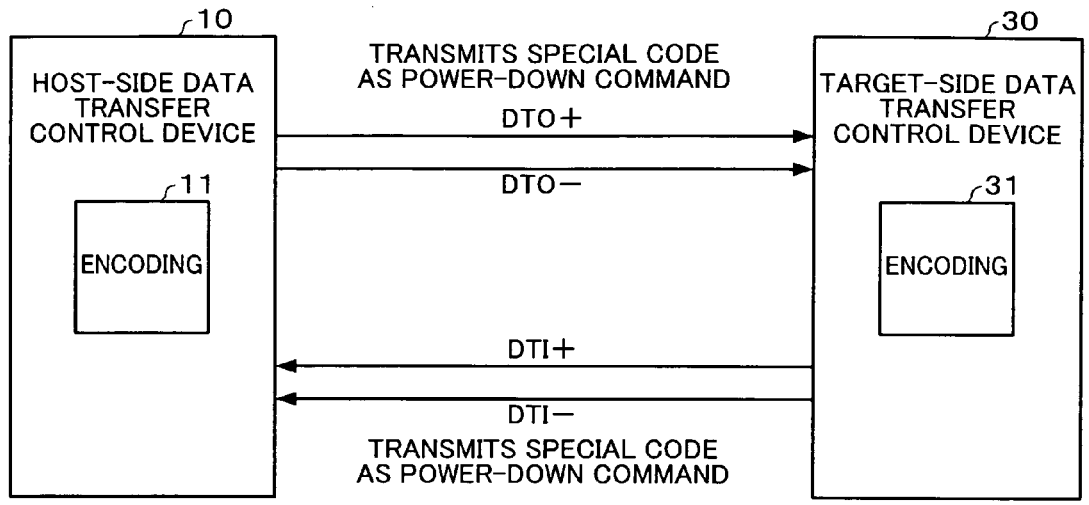
FIG. 12B
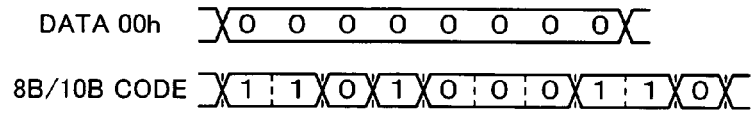
FIG. 12C
| CODE | SYMBOL | NAME |
|---|---|---|
| K28.5 | COM | Comma |
| K27.7 | STP | Start TLP |
| K28.2 | SDP | Start DLLP |
| K29.7 | END | End |
| K30.7 | EDB | EnD Bad |
| K23.7 | PAD | Pad |
| K28.0 | SKP | Skip |
| K28.1 | FTS | Fast Training Sequence |
| K28.3 | IDL | Idle |
| K28.4 | | |
| K28.6 | | |
| K28.7 | | |

FIG. 14

|  | STATE | HOST FUNC-TION | TARGET CLKIN | TARGET FUNC-TION | DTO TRANS-MISSION | DTI RECEP-TION | DTI TRANS-MISSION | DTO RECEP-TION | CLK TRANS-MISSION | CLK RECEP-TION |
|---|---|---|---|---|---|---|---|---|---|---|
|  | DEVICE DISABLED | × | × | × | × | × | × | × | × | × |
| T1 | TARGET DISABLED | ○ | × | × | × | × | × | × | × | × |
| T2 | OUT IDLE | ○ | ○ | ○ | ○ | — | — | ○ | ○ | ○ |
| T3 | OUT TRANSFER | ○ | ○ | ○ | ○ | — | — | ○ | ○ | ○ |
| T4 | OUT DISABLED | ○ | ○ | ○ | × | — | — | × | ○ | ○ |
| T5 | IN IDLE | ○ | ○ | ○ | — | ○ | ○ | — | ○ | ○ |
| T6 | IN TRANSFER | ○ | ○ | ○ | — | ○ | ○ | — | ○ | ○ |
| T7 | IN DISABLED | ○ | ○ | ○ | — | × | × | — | ○ | ○ |

DATA TRANSFER CONTROL DEVICE AND ELECTRONIC INSTRUMENT

Japanese Patent Application No. 2003-314055, filed on Sep. 5, 2003, Japanese Patent Application No. 2003-314056, filed on Sep. 5, 2003, Japanese Patent Application No. 2004-14412, filed on Jan. 22, 2004, Japanese Patent Application No. 2004-14413, filed on Jan. 22, 2004, and Japanese Patent Application No. 2004-65937, filed on Mar. 9, 2004, are hereby incorporated by reference in their entireties.

BACKGROUND OF THE INVENTION

The present invention relates to a data transfer control device and an electronic instrument.

In recent years, a high-speed serial transfer interface such as low voltage differential signaling (LVDS) has attracted attention as an interface standard aiming at reducing EMI noise or the like. In the high-speed serial transfer interface, data transfer is realized by allowing a transmitter circuit to transmit serialized data using differential signals and a receiver circuit to differentially amplify the differential signals. Japanese Patent Application Laid-open No. 2002-314397 and Japanese Patent Application Laid-open No. 2003-218843 have disclosed a conventional technology relating to the high-speed serial transfer interface, for example.

However, since the high-speed serial transfer interface allows current to constantly flow through the transmitter circuit and the receiver circuit, reduction of power consumption is limited. On the other hand, data transfer cannot be performed if the path of the constant current is cut. Therefore, the technical subject is to realize an effective power-down mode in the transmitter circuit and the receiver circuit conforming to the high-speed serial transfer interface.

BRIEF SUMMARY OF THE INVENTION

One aspect of the present invention relates to a host-side data transfer control device which performs data transfer with a target-side data transfer control device, the host-side data transfer control device including:

an OUT-transfer transmitter circuit which is connected with an OUT-transfer receiver circuit of the target-side data transfer control device through an OUT-transfer serial signal line, and transmits OUT data by driving the OUT-transfer serial signal line;

a clock-transfer transmitter circuit which is connected with a clock-transfer receiver circuit of the target-side data transfer control device through a clock-transfer serial signal line, and transmits a clock signal, which is used to sample the OUT data and is used to generate a system clock signal of the target-side data transfer control device, by driving the clock-transfer serial signal line; and a power-down setting circuit for setting a power-down mode which includes a first power-down mode and a second power down mode, wherein, in the first power-down mode, the power-down setting circuit sets the OUT-transfer transmitter circuit to the power-down mode and sets the clock-transfer transmitter circuit to the power-down mode to stop the system clock signal of the target-side data transfer control device, and, in the second power-down mode, the power-down setting circuit sets the OUT-transfer transmitter circuit to the power-down mode without setting the clock-transfer transmitter circuit to the power-down mode.

Another aspect of the present invention relates to a host-side data transfer control device which performs data transfer with a target-side data transfer control device, the host-side data transfer control device including:

an OUT-transfer transmitter circuit which is connected with an OUT-transfer receiver circuit of the target-side data transfer control device through an OUT-transfer serial signal line, and transmits OUT data by driving the OUT-transfer serial signal line;

a clock-transfer transmitter circuit which is connected with a clock-transfer receiver circuit of the target-side data transfer control device through a clock-transfer serial signal line, and transmits a clock signal, which is used to sample the OUT data and is used to generate a system clock signal of the target-side data transfer control device, by driving the clock-transfer serial signal line;

an IN-transfer receiver circuit which is connected with an IN-transfer transmitter circuit of the target-side data transfer control device through an IN-transfer serial signal line, and receives IN data; and a strobe-transfer receiver circuit which is connected with a strobe-transfer transmitter circuit of the target-side data transfer control device through a strobe-transfer serial signal line, and receives a strobe for sampling the IN data, wherein the strobe-transfer receiver circuit receives the strobe from the strobe-transfer transmitter circuit of the target-side data transfer control device, the strobe being generated by the target-side data transfer control device based on the clock signal transmitted by the clock-transfer transmitter circuit of the host-side data transfer control device.

A further aspect of the present invention relates to a target-side data transfer control device which performs data transfer with a host-side data transfer control device, the target-side data transfer control device including:

an OUT-transfer receiver circuit which is connected with an OUT-transfer transmitter circuit of the host-side data transfer control device through an OUT-transfer serial signal line, and receives OUT data;

a clock-transfer receiver circuit which is connected with a clock-transfer transmitter circuit of the host-side data transfer control device through a clock-transfer serial signal line, and receives a clock signal which is used to sample the OUT data and is used to generate a system clock signal of the target-side data transfer control device;

an IN-transfer transmitter circuit which is connected with an IN-transfer receiver circuit of the host-side data transfer control device through an IN-transfer serial signal line, and transmits IN data by driving the IN-transfer serial signal line; and a strobe-transfer transmitter circuit which is connected with a strobe-transfer receiver circuit of the host-side data transfer control device through a strobe-transfer serial signal line, and transmits a strobe for sampling the IN data by driving the strobe-transfer serial signal line, wherein the strobe-transfer transmitter circuit transmits the strobe generated based on the clock signal received by the clock-transfer receiver circuit to the strobe-transfer receiver circuit of the host-side data transfer control device.

BRIEF DESCRIPTION OF THE SEVERAL VIEWS OF THE DRAWING

FIGS. 2A and 2B are illustrative of a normal operation and a first power-down mode M1.

FIGS. 3A and 3B are illustrative of second and third power-down modes M1 and M2.

FIG. 4 is illustrative of power-down mode setting.

FIGS. 12A, 12B, and 12C are illustrative of a method using a special code.

FIG. 14 is illustrative of a power-down control method in an embodiment of the present invention.

DETAILED DESCRIPTION OF THE EMBODIMENT

Figure 1:
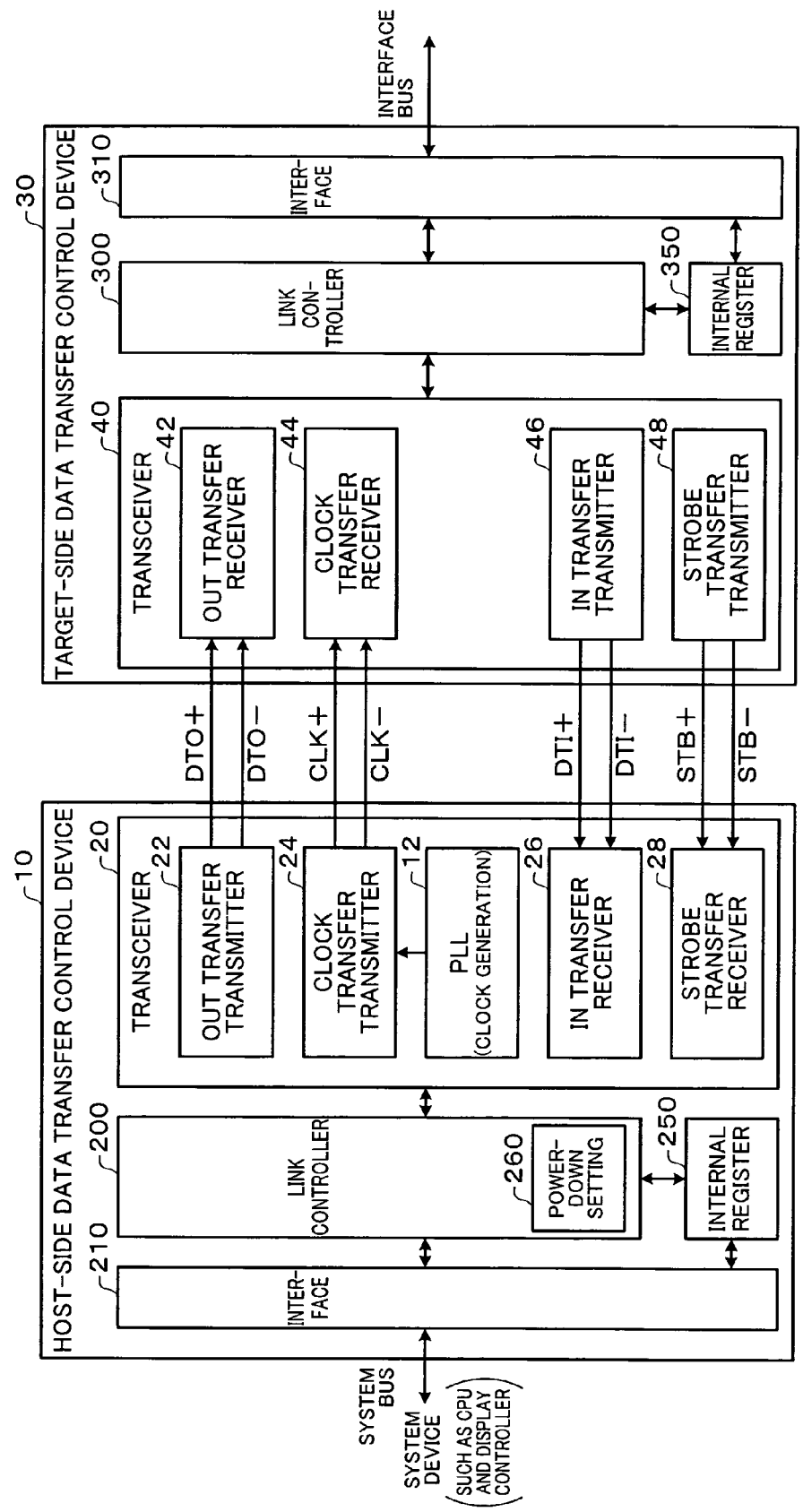
FIG. 1 is a configuration example of a data transfer control device.

Embodiments of the present invention are described below.

One embodiment of the present invention provides a host-side data transfer control device which performs data transfer with a target-side data transfer control device, the host-side data transfer control device including:

an OUT-transfer transmitter circuit which is connected with an OUT-transfer receiver circuit of the target-side data transfer control device through an OUT-transfer serial signal line, and transmits OUT data by driving the OUT-transfer serial signal line;

a clock-transfer transmitter circuit which is connected with a clock-transfer receiver circuit of the target-side data transfer control device through a clock-transfer serial signal line, and transmits a clock signal, which is used to sample the OUT data and is used to generate a system clock signal of the target-side data transfer control device, by driving the clock-transfer serial signal line; and a power-down setting circuit for setting a power-down mode which includes a first power-down mode and a second power down mode, wherein, in the first power-down mode, the power-down setting circuit sets the OUT-transfer transmitter circuit to the power-down mode and sets the clock-transfer transmitter circuit to the power-down mode to stop the system clock signal of the target-side data transfer control device, and, in the second power-down mode, the power-down setting circuit sets the OUT-transfer transmitter circuit to the power-down mode without setting the clock-transfer transmitter circuit to the power-down mode.

According to this embodiment, in the first power-down mode, the clock-transfer transmitter circuit is set to the power-down mode, and the system clock signal of the target-side data transfer control device stops. Therefore, the target-side data transfer control device can be set to the power-down mode without performing complicated control. In the second power-down mode, the clock-transfer transmitter circuit is not set to the power-down mode, and the OUT-transfer transmitter circuit is set to the power-down mode. A reduction of power consumption can be achieved by setting the OUT-transfer transmitter circuit to the power-down mode. Moreover, the system clock signal of the target-side data transfer control device is not stopped by not setting the clock-transfer transmitter circuit to the power-down mode. Therefore, the target can appropriately take action against the host, whereby a minute and intelligent power-down control can be realized.

This data transfer control device may include;

an IN-transfer receiver circuit which is connected with an IN-transfer transmitter circuit of the target-side data transfer control device through an IN-transfer serial signal line, and receives IN data; and a strobe-transfer receiver circuit which is connected with a strobe-transfer transmitter circuit of the target-side data transfer control device through a strobe-transfer serial signal line, and receives a strobe for sampling the IN data, and in the first power-down mode, the power-down setting circuit may set the OUT-transfer transmitter circuit, the clock-transfer transmitter circuit, the IN-transfer receiver circuit, and the strobe-transfer receiver circuit to the power-down mode, and, in the second power-down mode, the power-down setting circuit may set the OUT-transfer transmitter circuit, the IN-transfer receiver circuit, and the strobe-transfer receiver circuit to the power-down mode without setting the clock-transfer transmitter circuit to the power-down mode.

This enables a minute power-down control to be performed while realizing a full-duplex transfer.

This data transfer control device may include:

an IN-transfer receiver circuit which is connected with an IN-transfer transmitter circuit of the target-side data transfer control device through an IN-transfer serial signal line, and receives IN data; and a strobe-transfer receiver circuit which is connected with a strobe-transfer transmitter circuit of the target-side data transfer control device through a strobe-transfer serial signal line, and receives a strobe for sampling the IN data, and the power-down mode may include a third power-down mode, and in the third power-down mode, the power-down setting circuit may set the IN-transfer receiver circuit and the strobe-transfer receiver circuit to the power-down mode without setting the OUT-transfer transmitter circuit and the clock-transfer transmitter circuit to the power-down mode.

This enables the circuit which need not operate in the full-duplex transfer to be set to the power-down mode, whereby power consumption can be reduced.

With this data transfer control device, the strobe-transfer receiver circuit may receive the strobe from the strobe-transfer transmitter circuit of the target-side data transfer control device, the strobe being generated by the target-side data transfer control device based on the clock signal transmitted by the clock-transfer transmitter circuit.

According to this feature, since the vibration frequencies of the clock signal and the strobe become the same, a phase adjustment circuit with a complicated configuration or the like for sampling becomes unnecessary, whereby a reduction of power consumption and circuit scale can be achieved.

With this data transfer control device, at least one of the OUT-transfer transmitter circuit and the clock-transfer transmitter circuit transmits a power-down command to a receiver which is one of the OUT-transfer receiver circuit and the clock-transfer receiver circuit of the target-side data transfer control device for setting the receiver to the power-down mode by current-driving a serial signal line which is one of the OUT-transfer serial signal line and the clock-transfer serial signal line using a current driver in a normal transfer mode.

This makes it unnecessary to provide a signal line for transferring the power-down command separately from the serial signal line. As a result, the circuit scale can be reduced while realizing a reduction of power consumption.

With this data transfer control device, the OUT-transfer transmitter circuit may transmit the power-down command for setting the OUT-transfer receiver circuit and the clock-transfer receiver circuit of the target-side data transfer control device to the power-down mode by current-driving the OUT-transfer serial signal line using the current driver in the normal transfer mode.

With this data transfer control device, at least one of the OUT-transfer transmitter circuit and the clock-transfer transmitter circuit transmits a special code as the power-down command, the special code being obtained by using an encoding method which expands a bit width.

With this data transfer control device, at least one of the OUT-transfer transmitter circuit and the clock-transfer transmitter circuit includes a current driver and a voltage driver, the current driver current-driving a serial signal line which is one of the OUT-transfer serial signal line and the clock-transfer serial signal line, the voltage driver electrically disconnecting from the serial signal line in a normal transfer mode, and the voltage driver electrically connecting with the serial signal line and voltage-driving the serial signal line in the power-down mode, and wherein the voltage driver outputs a power-down voltage or a wakeup voltage to the serial signal line, the power-down voltage being used for setting a receiver which is one of the OUT-transfer receiver circuit and the clock-transfer receiver circuit of the target-side data transfer control device to the power-down mode, and the wakeup voltage being used for canceling the power-down mode of the receiver circuit.

This makes it unnecessary to provide a signal line for transferring the power-down voltage or the wakeup voltage separately from the serial signal line, whereby a reduction of the circuit scale and facilitation of mounting can be achieved.

Another embodiment of the present invention provides a host-side data transfer control device which performs data transfer with a target-side data transfer control device, the host-side data transfer control device including:

an OUT-transfer transmitter circuit which is connected with an OUT-transfer receiver circuit of the target-side data transfer control device through an OUT-transfer serial signal line, and transmits OUT data by driving the OUT-transfer serial signal line;

a clock-transfer transmitter circuit which is connected with a clock-transfer receiver circuit of the target-side data transfer control device through a clock-transfer serial signal line, and transmits a clock signal, which is used to sample the OUT data and is used to generate a system clock signal of the target-side data transfer control device, by driving the clock-transfer serial signal line;

an IN-transfer receiver circuit which is connected with an IN-transfer transmitter circuit of the target-side data transfer control device through an IN-transfer serial signal line, and receives IN data; and a strobe-transfer receiver circuit which is connected with a strobe-transfer transmitter circuit of the target-side data transfer control device through a strobe-transfer serial signal line, and receives a strobe for sampling the IN data, wherein the strobe-transfer receiver circuit receives the strobe from the strobe-transfer transmitter circuit of the target-side data transfer control device, the strobe being generated by the target-side data transfer control device based on the clock signal transmitted by the clock-transfer transmitter circuit of the host-side data transfer control device.

According to this embodiment, a full-duplex transfer can be realized. Moreover, since the vibration frequencies of the clock signal and the strobe become the same, a phase adjustment circuit with a complicated configuration or the like for sampling becomes unnecessary, whereby a reduction of power consumption and circuit scale can be achieved.

This data transfer control device may include a serial/parallel conversion circuit which samples the IN data received by the IN-transfer receiver circuit based on the strobe received by the strobe-transfer receiver circuit, converts serial data obtained by sampling the IN data into parallel data, and outputs the converted parallel data, and the serial/parallel conversion circuit may asynchronously transfer the parallel data to a logic circuit in a subsequent stage which operates in synchronization with the clock signal.

This enables an asynchronous transfer to be performed through a path at a low transfer rate, whereby a stable asynchronous transfer can be realized.

A further embodiment of the present invention provides a target-side data transfer control device which performs data transfer with a host-side data transfer control device, the target-side data transfer control device including:

an OUT-transfer receiver circuit which is connected with an OUT-transfer transmitter circuit of the host-side data transfer control device through an OUT-transfer serial signal line, and receives OUT data;

a clock-transfer receiver circuit which is connected with a clock-transfer transmitter circuit of the host-side data transfer control device through a clock-transfer serial signal line, and receives a clock signal which is used to sample the OUT data and is used to generate a system clock signal of the target-side data transfer control device;

an IN-transfer transmitter circuit which is connected with an IN-transfer receiver circuit of the host-side data transfer control device through an IN-transfer serial signal line, and transmits IN data by driving the IN-transfer serial signal line; and a strobe-transfer transmitter circuit which is connected with a strobe-transfer receiver circuit of the host-side data transfer control device through a strobe-transfer serial signal line, and transmits a strobe for sampling the IN data by driving the strobe-transfer serial signal line, wherein the strobe-transfer transmitter circuit transmits the strobe generated based on the clock signal received by the clock-transfer receiver circuit to the strobe-transfer receiver circuit of the host-side data transfer control device.

According to this embodiment, a full-duplex transfer can be realized. Moreover, since it is unnecessary to provide a clock generation circuit in the target-side data transfer control device, a reduction of power consumption and circuit scale can be achieved.

This data transfer control device may include a strobe control circuit which receives the clock signal received by the clock-transfer receiver circuit, and outputs the strobe to the strobe-transfer transmitter circuit by performing strobe control.

This data transfer control device may include a frequency divider circuit which receives the clock signal received by the clock-transfer receiver circuit, and generates the system clock signal of the target-side data transfer control device.

A still further embodiment of the present invention provides an electronic instrument including one of the above data transfer control devices and at least one of a communication device, a processor, an imaging device, and a display device.

Embodiments of the present invention are described below in detail. Note that the embodiments described hereunder do not in any way limit the scope of the invention defined by the claims laid out herein. Note also that not all of the elements of these embodiments should be taken as essential requirements to the means of the present invention.

1. Configuration Example of Data Transfer Control Device

FIG. 1 shows a configuration example of host-side and target-side data transfer control devices 10 and 30. In this embodiment, a bridge function between a system bus and an interface bus is realized by using the host-side and target-side data transfer control devices 10 and 30. The data transfer control devices 10 and 30 are not limited to the configuration shown in FIG. 1. Some of the circuit blocks shown in FIG. 1 may be omitted, or the connection configuration between the circuit blocks may be changed, or a circuit block differing from those shown in FIG. 1 may be added. A configuration in which at least one of link controllers 200 and 300 and interface circuits 210 and 310 is omitted may be employed.

The host (TX) side data transfer control device 10 and the target (RX) side data transfer control device 30 transfer packets through a serial bus for differential signals, for example. In more detail, the host-side data transfer control device 10 and the target-side data transfer control device 30 transmit or receive a packet by current-driving (or voltage-driving) differential signal lines (serial signal lines in a broad sense; hereinafter the same) of the serial bus.

The host-side data transfer control device 10 includes an interface circuit 210 which performs interface processing between the data transfer control device 10 and a system device such as a CPU and a display controller. The interface circuit 210 realizes an RGB interface, MPU interface, or serial interface between the data transfer control device 10 and the system device.

The host-side data transfer control device 10 includes the link controller 200 which performs link layer processing (packet generation, packet analysis, transaction control, and the like). The link controller 200 performs processing of generating a packet (request packet, stream packet, and the like) transferred to the target-side data transfer control device 30 through the serial bus, and transmitting the generated packet. In more detail, the link controller 200 starts a transmission transaction and directs a transceiver 20 to transmit the generated packet.

The host-side data transfer control device 10 includes the transceiver 20 (serial interface circuit) which performs physical layer processing or the like. The transceiver 20 transmits a packet indicated by the link controller 200 to the target-side data transfer control device 30 through the serial bus. The transceiver 20 receives a packet from the target-side data transfer control device 30. In this case, the link controller 200 analyzes the received packet and performs the link layer (transaction layer) processing.

The host-side data transfer control device 10 includes an internal register 250. The internal register 250 includes a port access register, a configuration register, an LVDS register, an interrupt control register, a target (RX) register, a power-down mode setting register, and the like. The system device writes an address (command) or data (parameter) into the internal register 250 through the system bus, or reads read data, status information, or the like from the internal register 250. The information in the target register of the internal register 250 is packetized and transferred to an internal register 350 of the target-side data transfer control device 30 through the serial bus. Specifically, the target-side internal register 350 is a subset (shadow register) of the host-side internal register 250.

The host-side data transfer control device 10 (link controller 100) includes a power-down setting circuit 260 which performs power-down settings. The power-down setting circuit 260 performs power-down setting processing of a PLL circuit 12, transmitter circuits 22 and 24, and receiver circuits 26 and 28 included in the transceiver 20. In more detail, the power-down setting circuit 260 performs power-down control based on power-down information set in the power-down setting register of the internal register 250. The system device such as the CPU sets the power-down information in the internal register 250 through the interface circuit 210. A power-down setting terminal may be provided to the host-side data transfer control device 10, and the power-down information may be set through the terminal. The transmitter circuit may be powered down by setting a power-down signal PDIN at active or setting input signals DIN+/− at inactive as described later, for example. The receiver circuit may be powered down by cutting a current path of a current source included in the receiver circuit as described later, for example.

The target-side data transfer control device 30 includes a transceiver 40 (serial interface circuit) which performs physical layer processing or the like. The transceiver 40 receives a packet from the host-side data transfer control device 10 through the serial bus. The transceiver 40 transmits a packet to the host-side data transfer control device 10. In this case, the link controller 300 generates a packet to be transmitted, and directs transmission of the generated packet.

The target-side data transfer control device 30 includes the link controller 300. The link controller 300 performs link layer (transaction layer) processing of receiving a packet from the host-side data transfer control device 10 and analyzing the received packet.

The target-side data transfer control device 30 includes an interface circuit 310 which performs interface processing between the data transfer control device 30 and one or more devices (liquid crystal display device, camera, and the like) connected with the interface bus. The interface circuit 310 may include an RGB interface circuit, an MPU interface circuit, a serial interface circuit, and the like (not shown).

The target-side data transfer control device 30 includes the internal register 350. The internal register 350 stores information necessary for the target. In more detail, the internal register 350 stores interface information for specifying the signal form (output format) of an interface signal output from the interface circuit 310 or the like.

2. Serial Transfer Method

A serial transfer method in this embodiment and a configuration example of the transceivers 20 and 40 are described below. In this embodiment, the host-side data transfer control device 10 is the side which supplies a clock signal, and the target-side data transfer control device 30 is the side which operates using the supplied clock signal as a system clock signal.

In FIG. 1, DTO+ and DTO− are data (OUT data) output to the target (data transfer control device 30) from the host (data transfer control device 10). CLK+ and CLK− are clock signals supplied to the target from the host. The host outputs the data DTO+/− in synchronization with the edge (rising edge, for example, but may be falling edge) of the clock signals CLK+/−. Therefore, the target can sample and capture the data DTO+/− using the clock signals CLK+/−. In FIG. 1, the target operates based on the clock signals CLK+/− supplied from the host. Specifically, the clock signals CLK+/− become the system clock signals of the target. Therefore, the phase locked loop (PLL) circuit 12 (clock generation circuit in a broad sense) is provided in the host, and is not provided in the target.

DTI+ and DTI− are data (IN data) output to the host from the target. STB+ and STB− are strobes (clock signals in a broad sense) supplied to the host from the target. The target generates and outputs the strobes STB+/− based on the clock signals CLK+/− supplied from the host. The target outputs the data DTI+/− in synchronization with the edge (rising edge, for example, but may be falling edge) of the strobes STB+/−. Therefore, the host can sample and capture the data DTI+/− using the strobes STB+/−.

Each of the data DTO+/−, the clock signals CLK+/−, the data DTI+/−, and the strobes STB+/− is transmitted by allowing a transmitter circuit (driver circuit) to current-drive the corresponding differential signal lines (serial signal line in a broad sense). In order to realize a higher speed transfer, two or more pairs of the DTO+/− differential signal lines and the DTI+/− differential signal lines may be provided.

The host-side transceiver 20 includes OUT-transfer (data transfer in a broad sense) and clock-transfer transmitter circuits 22 and 24, and IN-transfer (data transfer in a broad sense) and strobe-transfer (clock transfer in a broad sense) receiver circuits 26 and 28. The target-side transceiver 40 includes OUT-transfer and clock-transfer receiver circuits 42 and 44, and IN-transfer and strobe-transfer transmitter circuits 46 and 48. A configuration in which some of these circuit blocks are omitted may be employed. In the case where a full-duplex transfer is unnecessary, a configuration in which the host-side receiver circuits 26 and 28 and the target-side transmitter circuits 46 and 48 are omitted may be employed.

The OUT-transfer and clock-transfer transmitter circuits 22 and 24 respectively transmit the data DTO+/− and the clock signals CLK+/− by current-driving the DTO+/− differential signal lines and the CLK+/− differential signal lines (driving the serial signal lines in a broad sense). The OUT-transfer and clock-transfer receiver circuits 42 and 44 respectively receive the data DTO+/− and the clock signals CLK+/− by performing a current/voltage conversion based on the current which flows through the DTO+/−differential signal lines and the CLK+/− differential signal lines, and performing comparison processing (differential amplification processing) between differential voltage signals (first and second voltage signals) obtained by the current/voltage conversion.

The IN-transfer and clock-transfer transmitter circuits 46 and 48 respectively transmit the data DTI+/− and the strobes STB+/− by current-driving the DTI+/− differential signal lines and the STB+/− differential signal lines (driving the serial signal lines in a broad sense). The IN-transfer and strobe-transfer receiver circuits 26 and 28 respectively receive the data DTI+/− and the strobes STB+/− by performing a current/voltage conversion based on the current which flows through the DTI+/− differential signal lines and the STB+/− differential signal lines, and performing comparison processing (differential amplification processing) between differential voltage signals (first and second voltage signals) obtained by the current/voltage conversion. The following description is given taking a differential transfer method using the differential signals as an example. However, this embodiment may also be applied to a single end transfer.

3. Normal Operation

A normal operation of the data transfer control device is described below using FIG. 2A. As shown in FIG. 2A, the host-side transmitter circuits 22 and 24 and receiver circuits 26 and 28 are appropriately denoted by OUTTX, CLKTX, INRX, and STBRX, respectively. The target-side transmitter circuits 42 and 44 and receiver circuits 46 and 48 are appropriately denoted by OUTRX, CLKRX, INTX, and STBTX, respectively.

In the normal operation, OUTTX, CLKTX, INRX, STBRX, OUTRX, CLKRX, INTX, and STBTX are set to a normal operation mode. A host-side logic circuit 220 (link controller 200, interface circuit 210, and a part of the circuits of the transceiver 20) outputs parallel data to a parallel/serial conversion circuit 230. The serial/parallel conversion circuit 230 converts the parallel data into serial data and outputs the serial data to OUTTX. The PLL circuit 12 generates a clock signal CLK and outputs the clock signal CLK to CLKTX and a frequency divider circuit 234. The frequency divider circuit 234 generates a host-side system clock signal HSYSCLK by dividing the frequency of the clock signal CLK from the PLL circuit 12, and outputs the system clock signal HSYSCLK to the logic circuit 220. The host-side logic circuit 220 operates based on the system clock signal HSYSCLK.

The host-side OUTTX and CLKTX respectively transmit OUT data and a clock signal to the target-side OUTRX and CLKRX by current-driving the DTO+/− and CLK+/− serial signal lines. The target-side OUTRX and CLKRX receive the OUT data and the clock signal. A target-side serial/parallel conversion circuit 330 samples the serial OUT data received by the OUTRX based on the clock signal CLK received by CLKRX. The serial/parallel conversion circuit 330 converts the sampled serial data into parallel data and outputs the parallel data to a logic circuit 320 (link controller 300, interface circuit 310, and a part of the circuits of the transceiver 40). A frequency divider circuit 334 generates a target-side system clock signal TSYSCLK by dividing the frequency of the clock signal CLK received by CLKRX, and outputs the system clock signal TSYSCLK to the logic circuit 320. The target-side logic circuit 320 operates based on the system clock signal TSYSCLK.

The target-side logic circuit 320 outputs parallel data to the parallel/serial conversion circuit 340. The serial/parallel conversion circuit 340 converts the parallel data into serial data and outputs the serial data to INTX. A strobe control circuit (frequency divider circuit) 342 performs strobe control of the clock signal CLK received by CLKRX, and outputs a strobe STB to STBTX. In more detail, the strobe control circuit 342 generates the strobe STB by dividing the frequency of the clock signal CLK at an arbitrary dividing ratio. As the strobe control, clock phase control and clock delay control and the like can be given in addition to the frequency dividing control.

The target-side INTX and STBTX respectively transmit the IN data and the strobe to the host-side INRX and STBRX by current-driving the DTI+/− and STB+/− serial signal lines. The host-side INRX and STBRX receive the IN data and the strobe. The host-side serial/parallel conversion circuit 240 samples the serial IN data received by INRX based on the strobe STB received by STBRX. The serial/parallel conversion circuit 240 converts the sampled serial data into parallel data and outputs the parallel data to the logic circuit 220.

In a conventional data transfer control method such as a digital visual interface (DVI) (Japanese Patent Application Laid-open No. 2003-218843), PLL circuits are provided to transmission-side and reception-side data transfer control devices. Since the amount of power consumption of the PLL circuit accounts for a considerable portion of power consumption of the data transfer control device, it is difficult to realize a reduction of power consumption of the data transfer control device by using the conventional method.

Moreover, the phase of the clock signal generated by the transmission-side PLL circuit differs from the phase of the clock signal generated by the reception-side PLL circuit. Moreover, it is difficult to allow the frequencies of these clock signals to accurately coincide due to the difference in vibration frequency (frequency of crystal oscillator). Therefore, the conventional method requires a complicated circuit for preventing sampling errors, FIFO overflow/underflow, and the like. This poses a problem such as an increase in the scale of the data transfer control device or an increase in power consumption.

In this embodiment, the host transmits the clock signal CLK to the target, and the target generates the system clock signal TSYSCLK based on the received clock signal CLK, as shown in FIG. 2A. The target generates the strobe STB based on the received clock signal, and outputs the strobe STB to the host as the strobe STB for sampling the IN data. Therefore, by providing the PLL circuit 12 (clock generation circuit) only in the host, it may be unnecessary to provide a PLL circuit in the target. Therefore, power consumption of the target-side data transfer control device 30 can be significantly reduced in comparison with the conventional method.

Since the target-side system clock signal SYSCLK is generated based on the clock signal CLK transmitted from the host, the target can be set to the power-down mode merely by stopping the supply of the clock signal CLK from the host. Therefore, power-down control can be simplified as described later.

Moreover, since the target can sample the OUT data based on the clock signal CLK received from the host, it is unnecessary to provide a complicated circuit for preventing sampling errors, FIFO overflow/underflow, and the like. Therefore, a reduction of scale and power consumption of the data transfer control device can be achieved.

In this embodiment, a full-duplex transfer in which data is received while transmitting data can be realized by providing INRX, STBRX, INTX, and STBTX as shown in FIG. 2A. In present embodiment, the target generates the strobe STB based on the clock signal CLK transmitted from the host, and the host can sample the IN data using the strobe STB generated in this manner. Therefore, a problem in which the phase of the clock signal CLK and the phase of the strobe STB gradually shift from each other with the progress of time does not occur. As a result, occurrence of sampling errors or FIFO overflow/underflow can be prevented.

Specifically, in the conventional method in which the PLL circuits are provided to the transmission side and the reception side, the vibration frequency (frequency of crystal oscillator) of the transmission-side PLL circuit is not accurately the same as the vibration frequency of the reception-side PLL circuit. Therefore, since the phase of the transmission-side clock signal CLK and the phase of the reception-side strobe STB gradually shift from each other with the progress of time, a phase adjustment circuit with a complicated configuration is necessary.

In this embodiment, since the strobe STB is generated based on the clock signal CLK, the vibration frequencies of the strobe STB and the clock signal CLK are the same. Therefore, a phenomenon in which the phase of the strobe STB and the phase of the clock signal CLK gradually shift from each other with the progress of time does not occur. Therefore, after the circuit (delay value) is formed so that the IN data can be securely sampled by using the strobe STB, the IN data can be securely sampled by using the strobe STB without providing a phase adjustment circuit with a complicated configuration. Moreover, occurrence of overflow/underflow of the FIFO which stores the IN data can be effectively prevented.

4. Power-down Mode

The power-down mode in this embodiment is described below. In this embodiment, power-down modes M1, M2, M3, and M4 are provided as shown in FIG. 4. The power-down modes M1 to M4 are set when the system device writes the power-down information into the host-side internal register 250.

As shown in FIG. 2B, in the first power-down mode M1, the power-down setting circuit 260 sets OUTTX and CLKTX to the power-down mode. The system clock signal TSYSCLK of the target-side data transfer control device 30 is stopped by setting CLKTX to the power-down mode, and the target automatically transitions to the power-down mode.

As shown in FIG. 3A, in the second power-down mode M2, the power-down setting circuit 260 sets OUTTX to the power-down mode without setting CLKTX to the power-down mode.

In the case of a configuration which can realize a full-duplex data transfer, the power-down setting circuit 260 sets OUTTX, CLKTX, INRX, and STBRX to the power-down mode. In the power-down mode M2, the power-down setting circuit 260 sets OUTTX, INRX, and STBRX to the power-down mode without setting CLKTX to the power-down mode.

In the third power-down mode M3 in this embodiment, the power-down setting circuit 260 sets the reception-side INRX and STBRX to the power-down mode without setting the transmission-side OUTTX and CLKTX to the power-down mode, as shown in FIG. 3B. In the fourth power-down mode M4, OUTTX, INRX, and STBRX automatically transition to the power-down mode as shown in FIG. 4. When the OUT-transfer stops for a predetermined period and the host enters the idle state or the like, OUTTX is automatically set to the power-down mode. When the IN transfer stops for a predetermined period and the host enters the idle state or the like, INRX and STBRX are automatically set to the power-down mode.

In the power-down mode M1 in this embodiment, the target-side OUTRX, CLKRX, INTX, and STBTX are set to the power-down mode as shown in FIG. 2B. In the power-down mode M2, the target-side OUTRX, INTX, and STBTX are set to the power-down mode as shown in FIG. 3A. In the power-down mode M3, the target-side INTX, and STBTX are set to the power-down mode as shown in FIG. 3B. This may be realized by allowing the host-side transmitter circuit to transmit a power-down command for setting the receiver circuit to the power-down mode to the receiver circuit connected with the transmitter circuit by current-driving the serial signal lines using a current driver, as described later. In this case, it is preferable to transmit the power-down command by current-driving the data transfer serial signal lines instead of the clock-transfer serial signal lines, as described later.

For example, in the conventional method in which the PLL circuits are provided to the transmission side and the reception side, a predetermined procedure of stopping the reception-side PLL circuit is necessary for setting the reception side to the power-down mode, whereby power-down control becomes complicated.

According to this embodiment, the target-side system clock signal TSYSCLK is automatically stopped by setting CLKTX to the power-down mode by the power-down mode M1. This enables the target to be automatically set to the power-down mode, whereby the power-down control can be simplified.

According to this embodiment, the power-down mode M2 is provided in addition to the power-down mode M1. In the power-down mode M2, OUTTX and the like are set to the power-down mode. However, since CLKTX is not set to the power-down mode, the target-side system clock signal TSYSCLK is not stopped. Therefore, even if the data transfer control devices are set to the power-down mode M2, the target-side logic circuit 320 which operates based on the system clock signal TSYSCLK can take action against the host. In particular, in the case of a configuration which realizes a full-duplex data transfer, the power-down mode of INTX and STBTX can be canceled by allowing the target to take action against the host, whereby the IN data transfer can be resumed.

In the power-down mode M2, CLKTX is not set to the power-down mode, and OUTTX, INRX, and STBRX are set to the power-down mode. Therefore, since OUTTX, INRX, and STBRX, which consume a considerable amount of power in the data transfer control device, can be set to the power-down mode, power consumption can be reduced.

In this embodiment, only INRX and STBRX can be set to the power-down mode by setting the data transfer control device to the power-down mode M3. Therefore, when only the data transfer from the host to the target is performed and the data transfer from the target to the host is not performed (when full-duplex transfer is not performed), INRX and STBRX which need not operate can be set to the power-down mode, whereby power consumption can be reduced. Therefore, a more minute and intelligent power-down control can be realized.

5. Strobe Control Circuit

Figure 5:
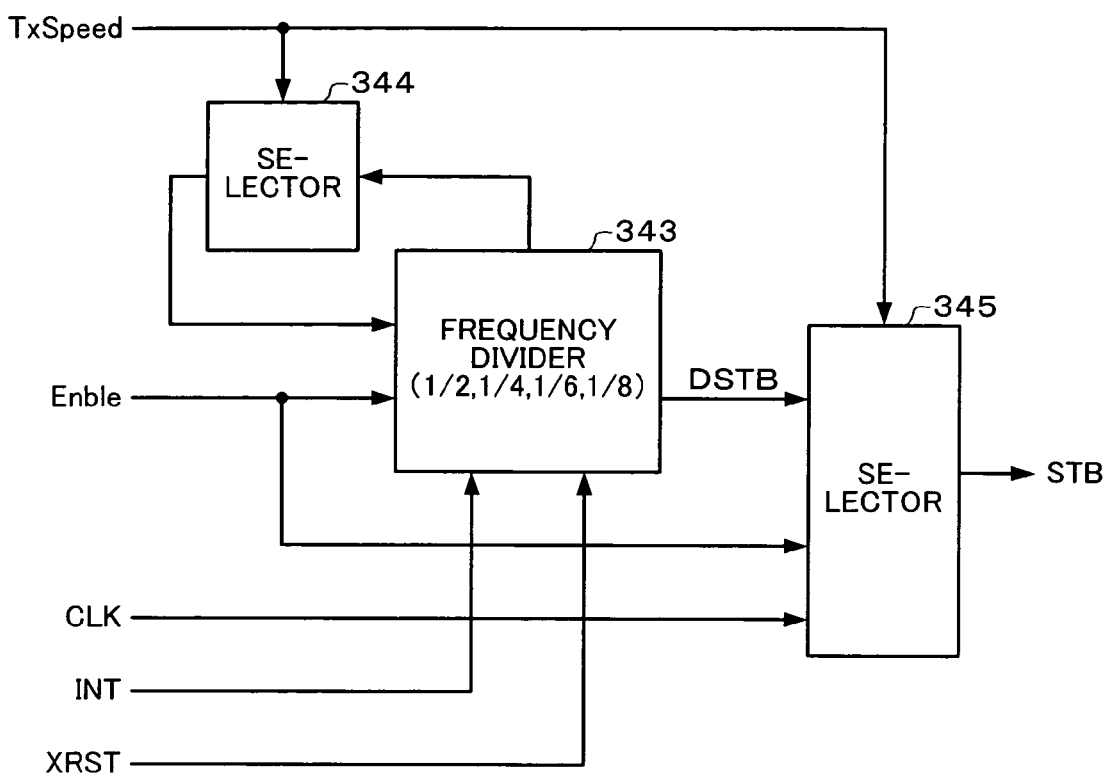
FIG. 5 is a configuration example of a strobe control circuit.

FIG. 5 shows a configuration example of the strobe control circuit 342. The strobe control circuit 342 includes a frequency divider circuit 343 and selectors 344 and 345.

The frequency divider circuit 343 may be formed by a plurality of stages of serially-connected D flip-flop circuits. A plurality of output signals from four stages of D-flip-flop circuits are input to the selector 344.

A signal TxSpeed is a signal for determining the dividing ratio of the strobe STB with respect to the clock signal CLK. The selector 344 selects one of the output signals of a plurality of stages of D-flip-flop circuits of the frequency divider circuit 343 based on the signal TxSpeed, and outputs the selected signal to a data terminal of the D-flip-flop circuit in the first stage of the frequency divider circuit 344, for example. This enables the frequency divider circuit 343 to generate a signal DSTB obtained by dividing the frequency of the clock signal CLK.

The signal DSTB from the frequency divider circuit 343 is input to a first input of the selector 345, and the clock signal CLK is input to a second input of the selector 345. The selector 345 selects the signal DSTB or the clock signal CLK based on the signal TxSpeed, and outputs the selected signal as the strobe STB. For example, the selector 345 selects the clock signal CLK when the signal TxSpeed indicates a dividing ratio of "1", and selects the signal DSTB when the signal TxSpeed indicates another dividing ratio.

A signal Enble is a signal which controls enabling/disabling of output of the strobe STB. A signal INIT is a control signal for initializing the frequency divider circuit 343. A signal XRST is a reset signal.

The data transfer rate of the IN transfer can be arbitrarily changed by providing the strobe control circuit 342 shown in FIG. 5, whereby a flexible data transfer control corresponding to the transfer data can be realized. The strobe control circuit 342 is not limited to the configuration shown in FIG. 5. A configuration which performs not only the frequency dividing control, but also strobe control such as phase control (delay control) may be employed, for example.

6. Asynchronous Transfer

Figure 6:
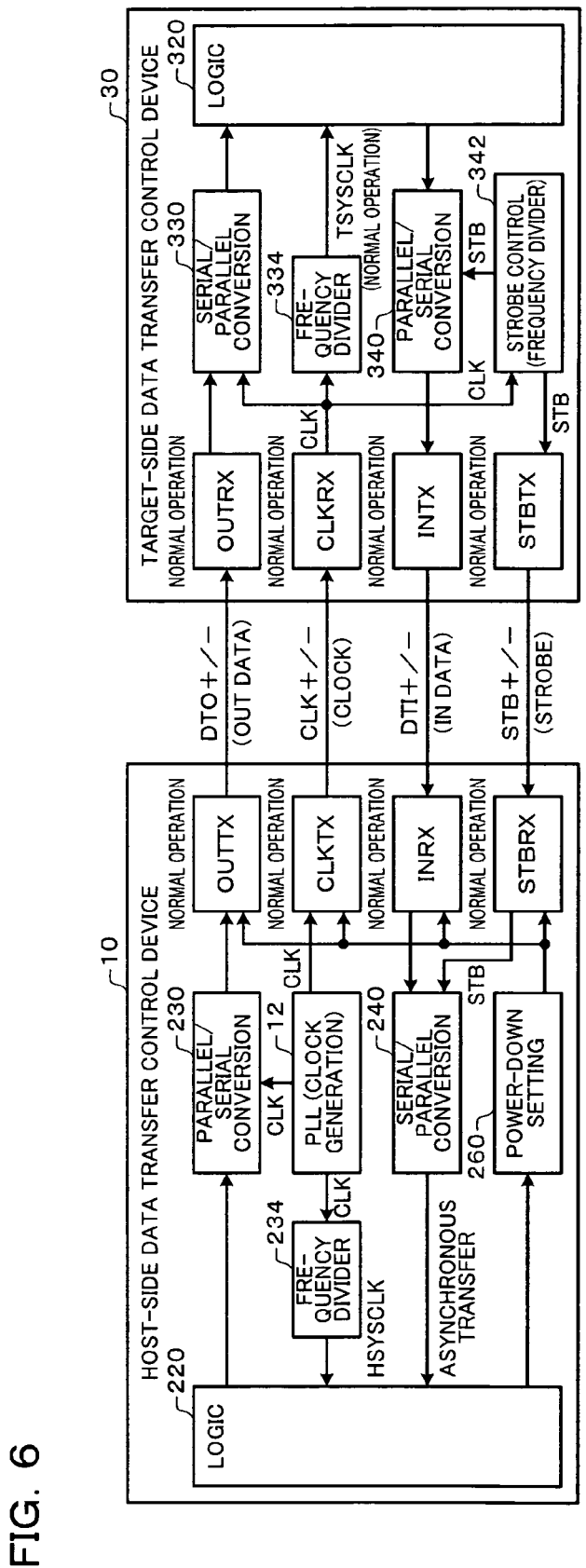
FIG. 6 is illustrative of asynchronous transfer.

In FIG. 6, in this embodiment, the IN data is transferred from the target in synchronization with the strobe STB. The host-side logic circuit 220 which receives the IN data operates in synchronization with the clock signal CLK generated by the PLL circuit 12. In more detail, the logic circuit 220 operates based on the system clock signal HSYSCLK generated by allowing the frequency divider circuit 234 to divide the frequency of the clock signal CLK. Therefore, the target must deliver data by asynchronous transfer.

In this embodiment, the serial/parallel conversion circuit 240 asynchronously transfers parallel data to the logic circuit 220 in the subsequent stage, as shown in FIG. 6.

In this embodiment, the transfer rate through the serial signal line is high (200 Mbps, for example). Therefore, since a critical path occurs when asynchronous transfer is performed through a path at such a high transfer rate, a stable asynchronous transfer cannot be realized. The transfer rate of the parallel data converted by the serial/parallel conversion circuit 240 is sufficiently lower than the transfer rate of the serial data. In the case where the serial data is converted into 16-bit parallel data, the transfer rate is reduced by 1/16, for example.

In FIG. 6, asynchronous transfer is performed in the path between the serial/parallel conversion circuit 240 and the logic circuit 220, which is the path in which the transfer rate is low. Therefore, the critical path or the like rarely occurs, whereby a stable asynchronous transfer can be realized. As the circuit in the subsequent stage of the serial/parallel conversion circuit 240, a circuit which decodes an 8B/10B code or the like can be given.

7. Configuration of Transmitter Circuit and Receiver Circuit

Figure 7:
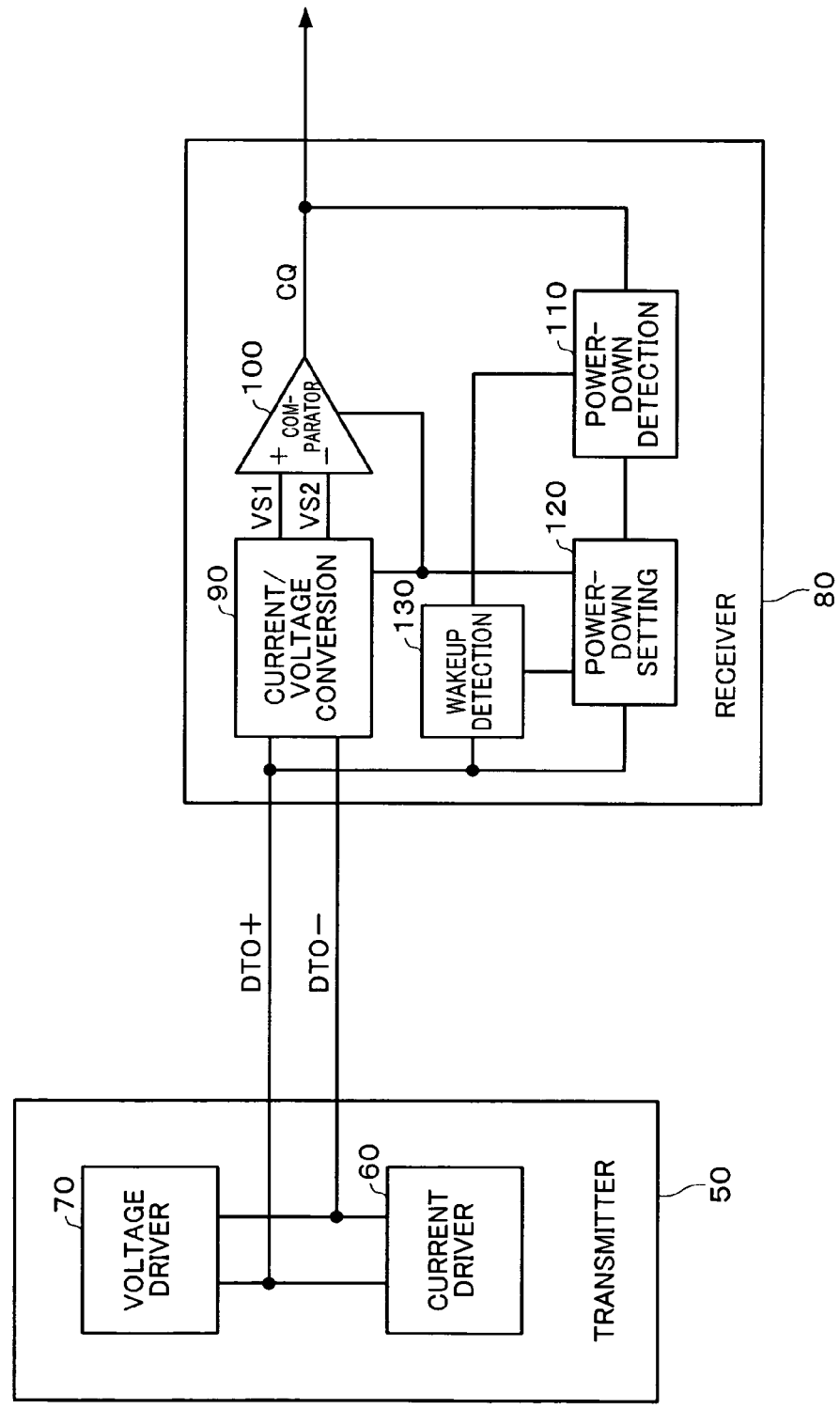
FIG. 7 is a configuration example of a transmitter circuit and a receiver circuit.

FIG. 7 shows a configuration example of the transmitter circuit (driver circuit) and the receiver circuit in this embodiment. The configurations and operations of the transmitter circuit and the receiver circuit for the data DTO+/− are mainly described below. However, the configurations and operations of the transmitter circuits and the receiver circuits for the clock signals CLK+/−, the data DTI+/−, and the strobes STB+/− are the same as those of the transmitter circuit and the receiver circuit for the data DTO+/−.

A transmitter circuit 50 includes a current driver 60 and a voltage driver 70. A receiver circuit 80 includes a current/voltage conversion circuit 90, a comparator 100, a power-down detection circuit 110, a power-down setting circuit 120, and a wakeup detection circuit 130 (wakeup detection buffer). The power-down setting circuit 120 may have a configuration in which some of these circuit blocks are omitted.

The current driver 60 is a driver which current-drives the DTO+/− differential signal lines (serial signal lines in a broad sense). In more detail, the current driver 60 alternately repeats a current drive which causes current to flow through the DTO+ signal line (first signal line of the differential signal lines in a broad sense) and a current drive which causes current to flow through the DTO− signal line (second signal line of the differential signal lines in a broad sense). The current driver 60 may alternately repeat a current drive in a first current path consisting of the DTO+ signal line as the outward path and the DTO− signal line as the return path (current path from the DTO+ signal line to the DTO− signal line) and a current drive in a second current path consisting of the DTO− signal line as the outward path and the DTO+ signal line as the return path (current path from the DTO− signal line to the DTO+ signal line). The current driver 60 may be formed by a current source (constant current source), a switching device (transistor) which performs current control for causing current from the current source to flow through the DTO+/− signal lines, and the like.

The voltage driver 70 is electrically disconnected from the DTO+/− differential signal lines (serial signal lines) in a normal transfer mode, and is connected with the differential signal lines and voltage-drives the differential signal lines in a power-down mode. The voltage driver 70 outputs a power-down voltage (voltage for setting the receiver circuit 80 to the power-down mode) or a wakeup voltage (voltage for canceling the power-down mode of the receiver circuit 80) to the differential signal lines. The voltage driver 70 may be formed by a circuit which outputs the power-down voltage or the wakeup voltage at a CMOS voltage level (voltage level which can cause a CMOS transistor to be turned ON/OFF), a switching device (transistor) which electrically connects/disconnects the output of the circuit with/from the differential signal lines, and the like.

The normal transfer mode is a mode in which the data or the clock signal (strobe) is normally transferred between the host and the target. The power-down mode is a mode in which power consumption is reduced by limiting or stopping current which flows through the transmitter circuit, the receiver circuit, or other circuits included in the device. In the voltage drive, the voltage of the differential signal lines is changed at the CMOS voltage level, for example. In the current drive, the voltage of the differential signal lines is changed at a voltage lower than the CMOS voltage level.

The current/voltage conversion circuit 90 performs a current/voltage conversion based on the current which flows through the differential signal lines, and outputs first and second voltage signals VS1 and VS2 which make up the differential voltage signals. In more detail, when the transmitter circuit 50 current-drives the DTO+ signal line, the current/voltage conversion circuit 90 performs a current/voltage conversion based on the current which flows through the DTO+ signal line to generate the first voltage signal VS1. When the transmitter circuit 50 current-drives the DTO− signal line, the current/voltage conversion circuit 90 performs a current/voltage conversion based on the current which flows through the DTO− signal line to generate the second voltage signal VS2. Or, when the transmitter circuit 50 alternately repeats the current drive in the first current path from the DTO+ signal line to the DTO− signal line and the current drive in the second current path from the DTO− signal line to the DTO+ signal line, the current/voltage conversion circuit 90 may generate the first and second voltage signals VS1 and VS2 across a resistor element (termination resistor) provided between the input node of the DTO+ signal line and the input node of the DTO− signal line.

The comparator (operational amplifier) 100 compares the first and second voltage signals VS1 and VS2 (amplifies the voltage between the first and second voltage signals VS1 and VS2), and outputs an output signal CQ (amplified signal). The comparator 100 outputs the output signal CQ at the H level (logic "1") of the CMOS voltage level when the voltage of the first voltage signal VS1 is higher than the voltage of the second voltage signal VS2, for example. The comparator 100 outputs the output signal CQ at the L level (logic "0") of the CMOS voltage level when the voltage of the second voltage signal VS2 is higher than the voltage of the first voltage signal VS1, for example.

The power-down detection circuit 110 is a circuit which detects a power-down command. In more detail, when the transmitter circuit 50 transmits the power-down command by current-driving the differential signal lines in the normal transfer mode (when the transmitter circuit 50 transmits transfer data including the power-down command), the power-down detection circuit 110 detects the transmitted power-down command based on the detection result from the comparator 100. In this case, the power-down detection circuit 110 may convert the output signal CQ from the comparator 100 from serial data to parallel data, and detect the power-down command based on the converted parallel data (detection result in a broad sense). The power-down detection circuit 110 may directly detect the power-down command from the output signal CQ (detection result in a broad sense) in the form of serial data.

The power-down setting circuit 120 is a circuit which sets the receiver circuit 80 to the power-down mode. In more detail, the power-down setting circuit 120 sets the current/voltage conversion circuit 90 and the comparator 100 to the power-down mode when the power-down command is detected. In this case, the power-down setting circuit 120 may set only one of the current/voltage conversion circuit 90 and the comparator 100 to the power-down mode, or may set both the current/voltage conversion circuit 90 and the comparator 100 to the power-down mode. Or, other circuits included in the receiver circuit 80 may be set to the power-down mode, or other circuits included in the target-side data transfer control device which includes the receiver circuit 80 or included in the host-side data transfer control device may be set to the power-down mode.

The wakeup detection circuit 130 is a circuit for detecting the wakeup state. In more detail, the wakeup detection circuit 130 detects the wakeup voltage output to the differential signal lines (at least one of the DTO+ signal line and the DTO− signal line) from the voltage driver 70. When the wakeup detection circuit 130 detects the wakeup voltage, the power-down mode set by the power-down setting circuit 120 is canceled, whereby the receiver circuit 80 transitions to the normal transfer mode. The wakeup detection circuit 130 may be a circuit which outputs the wakeup signal when cancellation of the power-down mode is detected after the receiver circuit 80 has been set to the power-down mode by output of the power-down voltage to the differential signal lines.

In this embodiment, the transmitter circuit 50 transmits the power-down command to the receiver circuit 80 by current-driving the differential signal lines. When the power-down detection circuit 110 detects the transmitted power-down command, the power-down setting circuit 120 sets the current/voltage conversion circuit 90 and the comparator 100 to the power-down mode. Therefore, according to this embodiment, current which constantly flows through the current/voltage conversion circuit 90 and the comparator 100 can be limited or stopped in the power-down mode, whereby power consumption can be reduced.

Moreover, according to this embodiment, the transmitter circuit 50 can individually set the receiver circuit 80 to the power-down mode. Specifically, in FIG. 1, the OUT-transfer and clock-transfer transmitter circuits 22 and 24 can respectively and individually set the OUT-transfer and clock-transfer receiver circuits 42 and 44 to the power-down mode. Or, the IN-transfer and strobe-transfer transmitter circuits 46 and 48 can respectively and individually set the IN-transfer and strobe-transfer receiver circuits 26 and 28 to the power-down mode. Therefore, a more minute and intelligent power-down control can be realized.

According to this embodiment, since the power-down command is transmitted in the normal transfer mode through the differential signal lines (serial signal lines), it is unnecessary to separately provide a control signal line exclusively for transmission of the power-down command. Therefore, since the number of signal lines can be reduced, a reduction of the circuit scale, facilitation of mounting, and a reduction of product cost can be achieved.

According to this embodiment, the voltage driver 70 is electrically connected with the differential signal lines in the power-down mode, and outputs the wakeup voltage to the receiver circuit 80 through the differential signal lines. When the wakeup detection circuit 130 detects the wakeup voltage, the power-down mode is canceled. Therefore, the transmitter circuit 50 can cancel the power-down mode of the receiver circuit 80, even if the current/voltage conversion circuit 90 and the comparator 100 are set to the power-down mode and a power-down cancel command cannot be transmitted by current-driving the differential signal lines. Moreover, since the power-down mode is canceled by voltage-driving the differential signal lines using the wakeup voltage, it is unnecessary to separately provide a control signal line exclusively for transmission of the power-down cancel command. As a result, since the number of signal lines can be reduced, a reduction of the circuit scale, facilitation of mounting, and a reduction of product cost can be achieved.

According to this embodiment, when the power-down voltage is output to the differential signal lines by the voltage driver 70 after the power-down command has been transmitted, the receiver circuit 80 is set to the power-down mode. When cancellation of the power-down mode is detected, the wakeup detection circuit 130 outputs the wakeup signal. This facilitates the power-down setting and the cancellation sequence.

According to this embodiment, the voltage driver 70 is electrically disconnected from the differential signal lines in the normal transfer mode. Therefore, an adverse effect on the normal transfer, in which the differential signal lines are current-driven, can be minimized.

8. First Configuration Example

Figure 8:
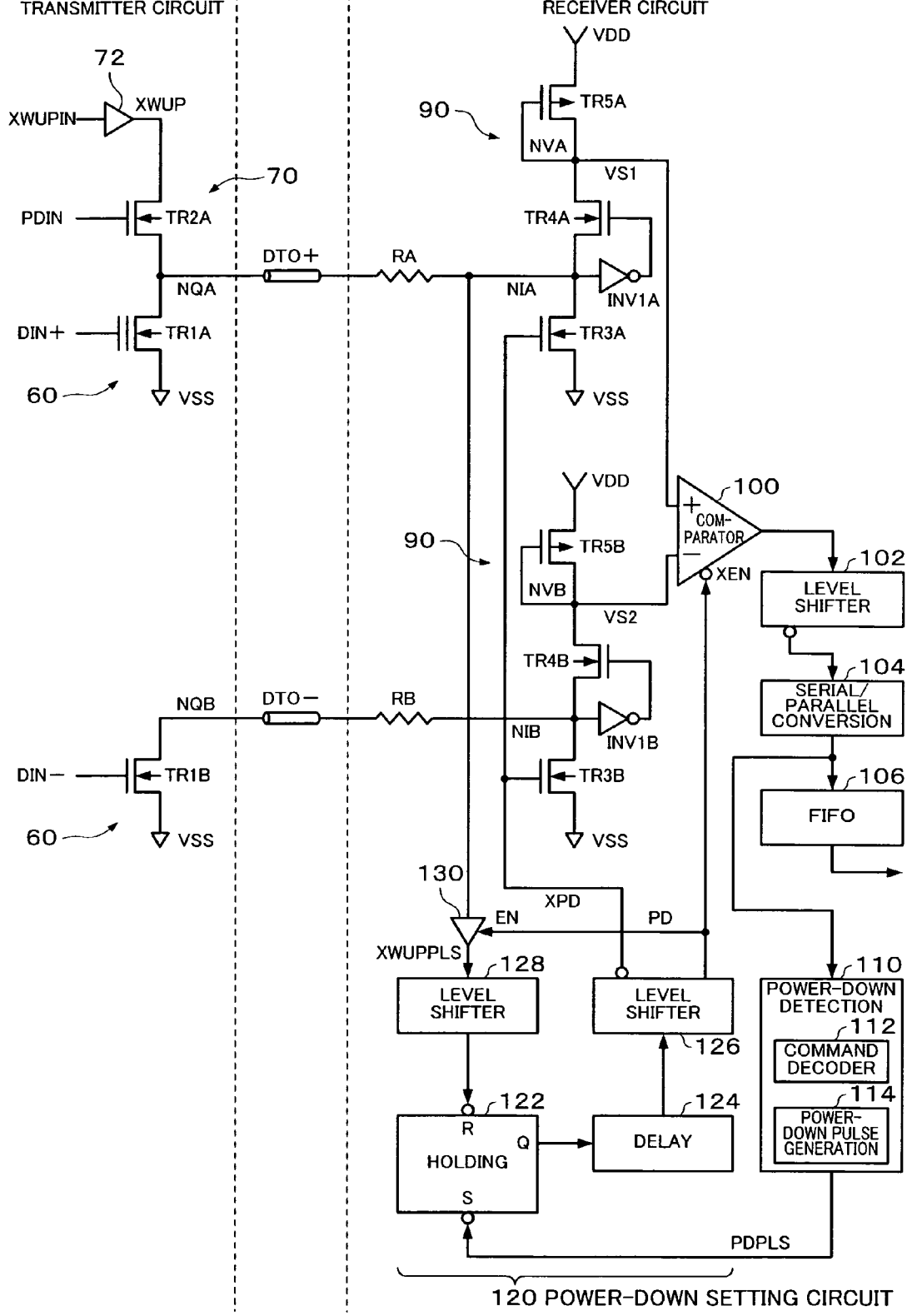
FIG. 8 is a detailed first configuration example of a transmitter circuit and a receiver circuit.

FIG. 8 shows a detailed first configuration example of the transmitter circuit and the receiver circuit. The transmitter circuit and the receiver circuit do not necessarily include all of the circuit elements shown in FIG. 8. The transmitter circuit and the receiver circuit may have a configuration in which some of the circuit elements are omitted.

The current driver 60 of the transmitter circuit includes an N-type (first conductivity type in a broad sense) transistor TR1A (first current source in a broad sense) provided between a first output node NQA and a power supply VSS (first power supply in a broad sense) on the side of the DTO+ signal line (first signal line in a broad sense). The current driver 60 includes an N-type transistor TR1B (second current source in a broad sense) provided between a second output node NQB and the power supply VSS on the side of the DTO− signal line (second signal line in a broad sense). In more detail, the output node NQA is connected with a drain terminal of the transistor TR1A, a positive-side first input signal DIN+ is input to a gate terminal of the transistor TR1A, and the power supply VSS is connected with a source terminal of the transistor TR1A. The output node NQB is connected with a drain terminal of the transistor TR1B, a negative-side second input signal DIN− is input to a gate terminal of the transistor TR1B, and the power supply VSS is connected with a source terminal of the transistor TR1B. A certain amount of current is caused to flow through the current sources formed by the transistors TR1A and TR1B, for example.

The transistor TR1A is turned ON when the input signal DIN+ becomes active (H level), whereby current flows through the path from the input node NIA of the receiver circuit on the side of the DTO+ signal line to the output node NQA of the transmitter circuit. The transistor TR1B is turned ON when the input signal DIN− becomes active, whereby current flows through the path from the input node NIB of the receiver circuit on the side of the DTO− signal line to the output node NQB of the transmitter circuit. Therefore, the DTO+/− differential signal lines can be differentially current-driven by alternately activating the input signals DIN+ and DIN−.

In FIG. 8, the transistors TR1A and TR1B have the function of the current source and the function of controlling the current which flows through the current source. However, the current source provided between the node NQA and the power supply VSS (first power supply) may be formed by the transistor TR1A (switching device in a broad sense) and a current source (transistor to which a reference voltage is input at a gate terminal, for example) provided between the transistor TR1A and the power supply VSS. The current source provided between the node NQB and the power supply VSS may be formed by the transistor TR1B (switching device in a broad sense) and a current source provided between the transistor TR1B and the power supply VSS. This realizes control which causes or does not cause the current from the current sources (constant current sources) to flow through the DTO+/− differential signal lines by ON/OFF controlling the transistors TR1A and TR1B. The current source provided between the node NQA and the power supply VSS may be formed by a current source (constant current source) which causes a large amount of current (constant current) to flow when the input signal DIN+ is active (H level), and causes a small amount of current (constant current) to flow when the input signal DIN+ is inactive (L level). The current source provided between the node NQB and the power supply VSS may be formed by a current source (constant current source) which causes a large amount of current (constant current) to flow when the input signal DIN− is active, and causes a small amount of current (constant current) to flow when the input signal DIN− is inactive. In FIG. 8, the current sources realized by the transistors TR1A and TR1B respectively cause current to flow from the receiver circuit to the transmitter circuit when the input signals DIN+ and DIN− are active. However, the current sources may cause current to flow from the transmitter circuit to the receiver circuit. In this case, the first power supply is a power supply VDD, for example.

The voltage driver 70 of the transmitter circuit includes an N-type transistor TR2A (switching device in a broad sense). The transistor TR2A functions as a switching device which is turned OFF in the normal transfer mode and is turned ON in the power-down mode. The output node NQA (or NQB) is connected with a source terminal of the transistor TR2A, and the output of the voltage output circuit 72 is connected with a drain terminal of the transistor TR2A. The transistor TR2A is turned OFF in the normal transfer mode and is turned ON in the power-down mode based on a power-down input signal PDIN input to the gate terminal. This allows the voltage driver 70 to be electrically disconnected from the differential signal lines in the normal transfer mode and to be electrically connected with the differential signal lines in the power-down mode. The voltage driver 70 voltage-drives the differential signal lines by using the voltage output circuit 72 when connected with the differential signal lines.

A wakeup input signal XWUPIN and the power-down input signal PDIN are generated by a layer (link layer or application layer) higher than the transmitter circuit which is a physical layer circuit. Specifically, when setting the receiver circuit to the power-down mode, the higher layer (power-down setting circuit) sets the signal PDIN at active (H level). When canceling the power-down mode of the receiver circuit, the higher layer (power-down setting circuit) sets the signal XWUPIN at active (L level).

The voltage output circuit 72 (voltage output buffer) is a circuit which voltage-drives the differential signal lines by outputting the signal XWUP at the CMOS voltage level. The voltage output circuit 72 outputs a voltage at the H level of the CMOS voltage level in the power-down mode (initial stage of the power-down mode), for example. The voltage output circuit 72 outputs a voltage (wakeup voltage) at the L level of the CMOS voltage level when canceling the power-down mode, for example.

In FIG. 8, the voltage output circuit 72 and the transistor TR2A which make up the voltage driver 70 are provided on the side of the DTO+ signal line (between the power supply VDD and the output node NQA). However, the voltage output circuit 72 and the transistor TR2A may be provided on the side of the DTO− signal line (between the power supply VDD and the output node NQB). A part or the entirety of the voltage driver 70 may be provided both on the side of the DTO+ signal line and the side of the DTO− signal line.

The current/voltage conversion circuit 90 of the receiver circuit includes a transistor TR3A (first current source on the side of the receiver circuit in a broad sense) provided between the input node NIA and the power supply VSS (first power supply), and a transistor TR3B (second current source on the side of the receiver circuit in a broad sense) provided between the input node NIB and the power supply VSS. A certain amount of current is caused to flow through the current sources formed by the transistors TR3A and TR3B. The voltages of the input nodes NIA and NIB and the voltage output nodes NVA and NVB can be maintained within a predetermined range by causing current to constantly and continuously flow through the transistors TR3A and TR3B, even if the transistors TR1A and TR1B are in the OFF state. Therefore, the operation speed of the current/voltage conversion circuit 90 can be increased.

In FIG. 8, the transistors TR3A and TR3B have the function of the current source and the function of controlling the current which flows through the current source. However, the current source provided between the node NIA and the power supply VSS (first power supply) may be formed by the transistor TR3A (switching device in a broad sense) and a current source (transistor to which the reference voltage is input at a gate terminal, for example) provided between the transistor TR3A and the power supply VSS. The current source provided between the node NIB and the power supply VSS may be formed by the transistor TR3B (switching device in a broad sense) and a current source provided between the transistor TR3B and the power supply VSS.

The current/voltage conversion circuit 90 includes a first inverter circuit INV1A (voltage amplifier circuit) of which the input is connected with the input node NIA, and a second inverter circuit INV1B (voltage amplifier circuit) of which the input is connected with the input node NIB. The current/voltage conversion circuit 90 includes an N-type transistor TR4A (first variable resistor element in a broad sense) of which the source terminal is connected with the input node NIA, the gate terminal is connected with the output of the inverter circuit INV1A, and the drain terminal is connected with the voltage output node NVA. The current/voltage conversion circuit 90 includes an N-type transistor TR4B (second variable resistor element in a broad sense) of which the source terminal is connected with the input node NIB, the gate terminal is connected with the output of the inverter circuit INV1B, and the drain terminal is connected with the voltage output node NVB.

The transistors TR4A and TR4B function as variable resistor elements of which the resistance is variably controlled based on the voltages (potentials) of the input nodes NIA and NIB, respectively. The inverter circuits INV1A and INV1B function as circuits which control the ON-resistance of the transistors TR4A and TR4B by amplifying the changes in voltage of the input nodes NIA and NIB, respectively. In more detail, when the transistors TR1A and TR1B are turned ON and the voltages of the input nodes NIA and NIB are changed to the L (low) level, the inverter circuits INV1A and INV1B amplify the changes in voltage. This causes the output voltages of the inverter circuits INV1A and INV1B to be changed to the H (high) level, whereby the ON-resistance of the transistors TR4A and TR4B is decreased. This enables the change in current which is caused to flow by the transistors TR1A and TR1B to be amplified (accelerated), whereby the voltages of the voltage output nodes NVA and NVB can be quickly changed to the L level. Specifically, a minute change in current at the nodes NIA and NIB (transistors TR1A and TR1B) can be amplified and transmitted to the nodes NVA and NVB (transistors TR5A and TR5B) by providing the transistors TR4A and TR4B and the inverter circuits INV1A and INV1B. The current/voltage conversion circuit 90 may have a configuration in which the transistors TR4A and TR4B and the inverter circuits INV1A and INV1B are omitted.

The current/voltage conversion circuit 90 includes a P-type (second conductivity type in a broad sense) transistor TR5A (first current/voltage conversion element in a broad sense) provided between the voltage output node NVA and the power supply VDD (second power supply in a broad sense), and a P-type transistor TR5B (second current/voltage conversion element in a broad sense) provided between the voltage output node NVB and the power supply VDD. In more detail, the transistors TR5A and TR5B are connected with the power supply VDD at a source terminal and are connected with the voltage output nodes NVA and NVB at a gate terminal and a drain terminal, respectively. The transistors TR5A and TR5B function as current/voltage conversion elements (load elements) which convert current which flows between the power supply VDD and the voltage output nodes NVA and NVB into voltage. The current/voltage conversion elements need not be formed by the transistors TR5A and TR5B (load transistors), but may be formed by other circuit elements such as resistors.

The current/voltage conversion circuit 90 includes a resistor RA provided between the DTO+ signal line and the input node NIA, and a resistor RB provided between the DTO− signal line and the input node NIB. The resistors RA and RB are resistors for impedance matching. The current/voltage conversion circuit 90 may have a configuration in which the resistors RA and RB are omitted.

The output signal from the comparator 100 is input to a level shifter 102, and the voltage level is converted (from 2.8 V to 1.8 V, for example). The inversion output signal from the level shifter 102 is input to a serial/parallel conversion circuit 104. The inversion output signal (negative logic) from the comparator 100 may be input to the level shifter 102, and the output signal (positive logic) from the level shifter 102 may be input to the serial/parallel conversion circuit 104.

The serial/parallel conversion circuit 104 converts the serial data from the comparator 100 into parallel data. The parallel data output from the serial/parallel conversion circuit 104 is stored in a FIFO, and output to a higher layer circuit in the subsequent stage (layer higher than the physical layer).

The power-down detection circuit 110 detects the power-down command based on the parallel data (parallel signal) from the serial/parallel conversion circuit 104. In more detail, the power-down detection circuit 110 detects the power-down command included in the data transmitted from the transmitter circuit in the normal transfer mode. The power-down detection circuit 110 may directly detect the power-down command from the output signal from the comparator 100.

The power-down detection circuit 110 includes a command decoder 112 and a power-down pulse generation circuit 114. The command decoder 112 detects the power-down command by the decode processing. When the transmitter circuit transmits a special code generated by using an encoding method (8B/10B encoding, for example) which expands the bit width as the power-down command, the power-down detection circuit 110 detects the special code to which the power-down command is assigned by decode processing of the command decoder 112. The power-down pulse generation circuit 114 generates a power-down pulse signal PDPLS when the power-down command is detected. The power-down pulse generation circuit 114 also performs processing of adjusting the generation timing of the signal PDPLS.

The power-down setting circuit 120 includes a holding circuit 122, a delay circuit 124, and level shifters 126 and 128. The power-down setting circuit 120 may have a configuration in which some of these circuit blocks are omitted.

The holding circuit 122 holds power-down setting information (power-down setting flag) when the power-down command is detected until the power-down mode is canceled. In more detail, the holding circuit 122 is set when the signal PDPLS becomes active (L level), whereby the logic "1" (power-down setting information) is held. The holding circuit 122 may be realized by an RS flip-flop with a reset terminal and a set terminal or the like.

The output signal from the holding circuit 112 is input to the delay circuit 124, and delay processing of the signal is performed. The output signal from the delay circuit 124 is input to the level shifter 126, and the voltage level is converted (from 1.8 V to 2.8 V). A positive logic power-down signal PD, which is the output signal from the level shifter 126, is input to an enable terminal XEN (negative logic) of the comparator 100 and an enable terminal EN (positive logic) of the wakeup detection circuit 130. A negative logic power-down signal XPD, which is the inversion output signal from the level shifter 126, is input to the gate terminals of the transistors TR3A and TR3B.

The wakeup detection circuit 130 (wakeup detection buffer) is a circuit which detects the wakeup voltage when the transmitter circuit outputs the wakeup voltage to the differential signal lines. The wakeup detection circuit 130 operates at the CMOS voltage level, and detects the wakeup voltage at the CMOS voltage level. In FIG. 8, the wakeup detection circuit 130 is connected with the DTO+ signal line. However, the wakeup detection circuit 130 may be connected with the DTO− signal line, or may be connected with both the DTO+ and DTO− signal lines.

Since the signal PD is set at the L level in the normal transfer mode, the comparator 100 is set to the enabled state and the wakeup detection circuit 130 is set to the disabled state. Since the signal XPD is set at the H level, the transistors TR3A and TR3B are turned ON. Since the signal PD is set at the H level when the power-down command is detected, the comparator 100 is set to the disabled state and set to the power-down mode (mode in which the operating current is stopped or limited), and the wakeup detection circuit 130 is set to the enabled state. Since the signal XPD is set at the L level, the transistors TR3A and TR3B are turned OFF, whereby the current/voltage conversion circuit 90 is set to the power-down mode.

When the voltage output circuit 72 outputs the wakeup voltage at the L level in the power-down mode, the wakeup detection circuit 128 set to the enabled state detects the wakeup voltage, and outputs a signal XWUPPLS which is a signal for canceling the power-down mode. The holding circuit 122 is reset when the pulse signal XWUPPLS at the L level from the wakeup detection circuit 128 is input to a reset terminal of the holding circuit 122 through the level shifter 128. This causes the power-down setting information (logic "1") to be cleared, whereby the power-down mode is canceled.

Figure 9:
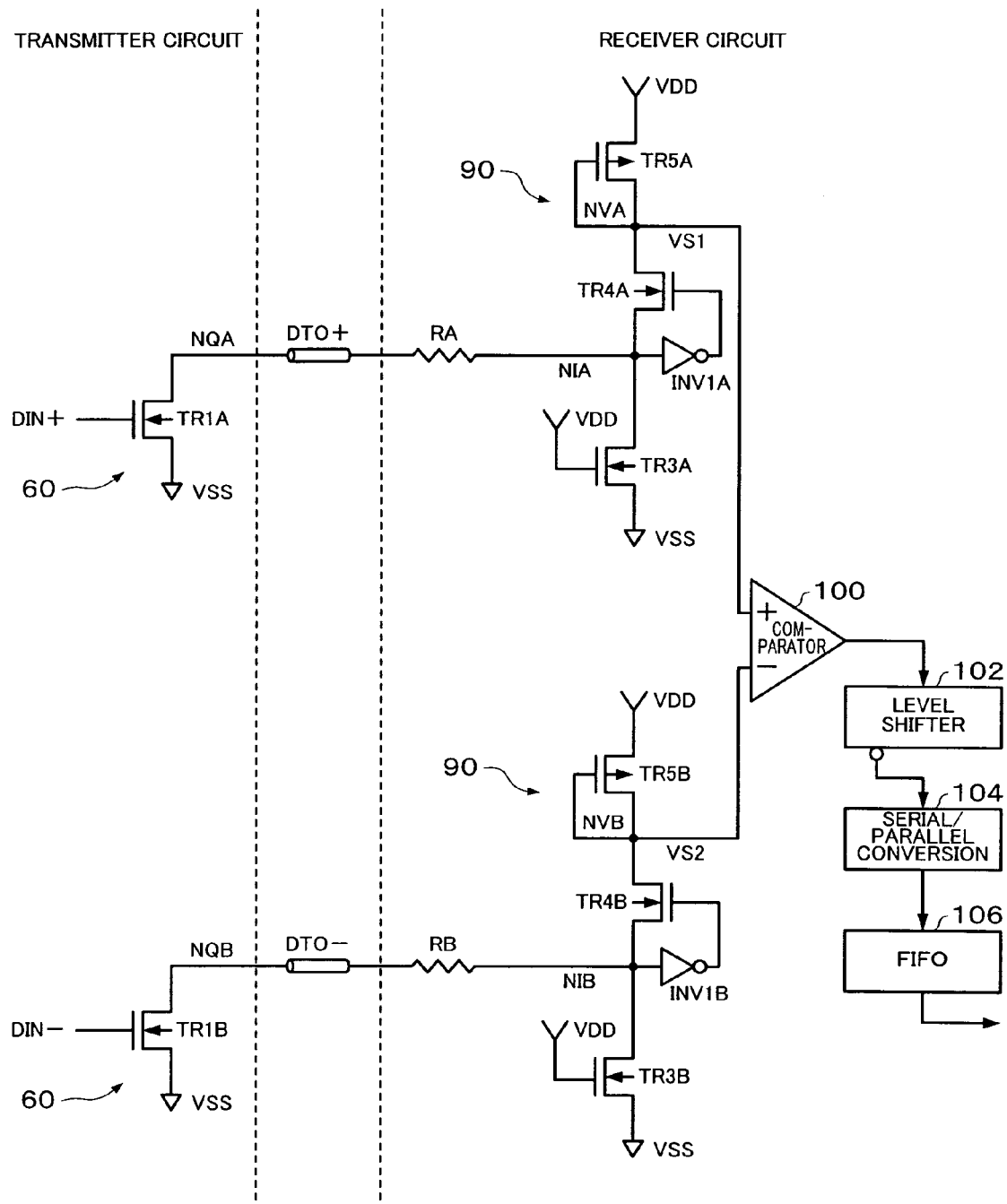
FIG. 9 is a comparative example of a transmitter circuit and a receiver circuit.

FIG. 9 shows a configuration of the transmitter circuit and the receiver circuit, in which the voltage driver 70, the power-down detection circuit 110, and the power-down setting circuit 120 are not provided, as a comparative example.

9. Operation

Figure 10:
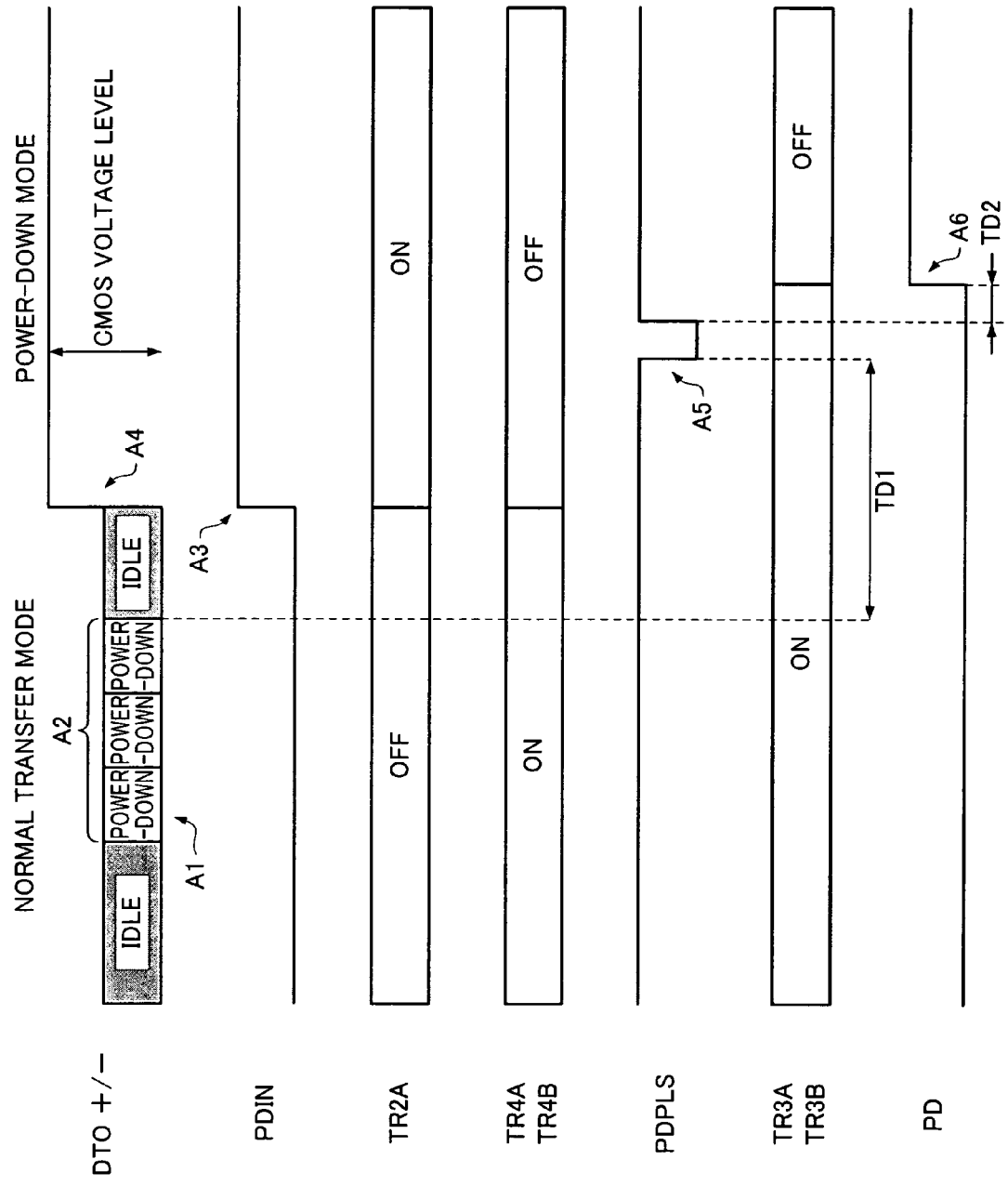
FIG. 10 is a waveform diagram illustrating an operation in the first configuration example.

The operation in the first configuration example shown in FIG. 8 is described below using waveform diagrams shown in FIGS. 10 and 11. The operation in the normal transfer mode is described below. As shown in FIG. 10, since the signal PDIN is set at the L level in the normal transfer mode, the transistor TR2A is in the OFF state. Since the power-down signal PD is set at the L level, the transistors TR3A and TR3B are in the ON state. The voltage driver 70 is electrically disconnected from the differential signal lines when the transistor TR2A is turned OFF. A normal operating current flows through the current/voltage conversion circuit 90 when the transistors TR3A and TR3B are turned ON, whereby the normal transfer can be realized. Specifically, the configuration shown in FIG. 8 becomes equivalent to the configuration shown in FIG. 9.

In the normal transfer mode, the transmitter circuit and the receiver circuit operate as described below. When the transistors TR1A and TR1B are in the OFF state, the input nodes NIA and NIB are set at a voltage of about 1 V, for example. When the transistor TR1A on the side of the DTO+ signal line is turned ON, current flows toward the power supply VSS (GND) through the differential signal lines. This causes the voltage of the input node NIA to be decreased to only a small extent. As a result, the voltage of the input node NIA is reversed by the inverter circuit INV1A and the output voltage of the inverter circuit INV1A is increased, whereby the ON-resistance of the transistor TR4A is decreased. This increases the amount of current which flows through the transistor TR5A. Therefore, the voltage difference between the power supply VDD and the voltage output node NVA (voltage between the drain and source of the transistor TR5A) is increased, whereby the voltage of the voltage output node NVA is decreased. When the transistor TR1B on the side of the DTO− signal line is turned ON, the voltage of the voltage output node NVB is decreased. Therefore, the data "0" or "1" is detected by allowing the comparator 100 to compare and amplify the voltage difference between the voltage output nodes NVA and NVB.

The operation during power-down command transmission is described below. At A1 shown in FIG. 10, the transmitter circuit transmits the power-down command to the receiver circuit. In this embodiment, since the power-down command is transmitted in the normal transfer mode in which the differential signal lines are current-driven, it is unnecessary to provide an extra signal line.

As indicated by A2 in FIG. 10, the transmitter circuit may transmit a plurality of power-down commands by current-driving the differential signal lines. The power-down setting circuit 120 may set the current/voltage conversion circuit 90 and the comparator 100 to the power-down mode on condition that a plurality of power-down commands are detected.

A problem in which the receiver circuit 80 is erroneously set to the power-down mode can be prevented, even when a transfer error occurs, by transmitting and detecting a plurality of power-down commands. Specifically, if the receiver circuit 80 is erroneously set to the power-down mode, it is difficult for the receiver circuit 80 to recover from the power-down mode. However, such a problem can be prevented by transmitting and detecting a plurality of power-down commands.

The operation at the time of power-down setting is described below. As indicated by A3 shown in FIG. 10, the transistor TR2A is turned ON when the signal PDIN is set at the H level, whereby the voltage driver 70 is electrically connected with the differential signal lines. The voltage driver 70 outputs a voltage at the H level of the CMOS voltage level to the differential signal lines as indicated by A4, whereby the transistor TR4A is turned OFF. An unnecessary current can be prevented from flowing through the path from the transistor TR5A to the voltage output circuit 72 through the transistor TR4A, the DTO+ signal line, and the transistor TR2A by causing the transistor TR4A to be turned OFF, whereby power consumption can be reduced.

When the transmitter circuit transmits the power-down command, a power-down pulse signal PDPLS becomes active (L level) after the period TD1 has elapsed as indicated by A5 shown in FIG. 10. The period TD1 can be adjusted by the power-down pulse generation circuit 114. The logic "1" is set in the holding circuit 122 when the signal PDPLS becomes active. As indicated by A6, the power-down signal PD becomes active after the period TD2 has elapsed. The period TD2 can be adjusted by the delay circuit 124.

When the signal PD becomes active, the transistors TR3A and TR3B are turned OFF, and the comparator 100 is set to the disabled state. Therefore, the operating current which constantly flows through the current/voltage conversion circuit 90 and the comparator 100 can be cut, whereby power consumption can be reduced. Moreover, since the wakeup detection circuit 130 is set to the enabled state, the wakeup voltage output to the differential signal lines can be detected.

The operation at the time of power-down cancellation is described below using FIG. 11. As indicated by B1 shown in FIG. 11, a voltage at the H level of the CMOS voltage level is output to the DTO+ (or DTO−) signal line in the power-down mode. When canceling the power-down mode, the voltage output circuit 72 outputs the wakeup voltage at the L level of the CMOS voltage level to the DTO+ signal line as indicated by B2. The signal PDIN is set at the L level after the period TD3 has elapsed, whereby the transistor TR2A is turned OFF and the voltage output circuit 72 is electrically disconnected from the DTO+ signal line.

When the wakeup voltage is output, the wakeup detection circuit 130 set to the enabled state detects the wakeup voltage, and sets the signal XWUPPLS at the L level as indicated by B4. This causes the holding circuit 122 to be reset to the logic "0", and the power-down signal PD is set at the L level after the period TD4 has elapsed, as indicated by B5. This causes the transistors TR3A and TR3B to be turned ON and the comparator 100 to be set to the enabled state, whereby the power-down mode is canceled. The wakeup detection circuit 130 is set to the disabled state. As indicated by B6, the differential signal lines are set to the idle state after an undefined period, whereby the normal transfer can be enabled.

10. Transmission of Power-down Command Using Special Code

In this embodiment, encoding circuits 11 and 31 may be respectively provided in the host-side data transfer control device 10 and the target-side data transfer control device 30 (transmitter circuit), as shown in FIG. 12A. The encoding circuits 11 and 31 encode the data using an encoding method which expands the bit width, for example. As the encoding method, an 8B/10B encoding method in which 8-bit data is converted into 10-bit data can be given, for example. According to the 8B/10B encoding method, even if the data continuously contains "0" or "1", a change in bits of the signal is increased after encoding as shown in FIG. 12B, whereby occurrence of transfer errors due to noise or the like can be reduced. According to the 8B/10B encoding method, since the bit width is expanded from 8 bits to 10 bits, a special code (similar to control code) shown in FIG. 12C can be transmitted in addition to data.

In this embodiment, the power-down command is assigned to the special code and transmitted, as shown in FIG. 12A. The power-down command is detected by detecting the special code to which the power-down command is assigned by the decode processing of the command decoder 112 shown in FIG. 8. Occurrence of transfer errors can be reduced by effectively utilizing the encoding method. Moreover, transmission and detection of the power-down command can be easily realized by current-driving the differential signal lines. Furthermore, data transfer can be performed by assigning the special code to the start code or the end code of a packet.

The encoding method performed by the encoding circuit 11 and 31 may be encoding which expands the bit width, and the encoding method is not limited to the 8B/10B encoding.

11. Power-down Mode Setting of Clock-transfer Receiver Circuit

According to this embodiment, the transmitter circuits 22, 24, 46, and 48 can separately set the corresponding receiver circuits 42, 44, 26, and 28 to the power-down mode in FIG. 1. Therefore, the power-down command for setting the clock-transfer receiver circuit 44 to the power-down mode or the wakeup voltage for canceling the power-down mode may be transferred through the CLK+/− differential signal lines. The power-down command for setting the strobe-transfer (clock transfer in a broad sense) receiver circuit 28 to the power-down mode or the wakeup voltage for canceling the power-down mode may be transferred through the STB+/− differential signal lines.

Figure 13A:
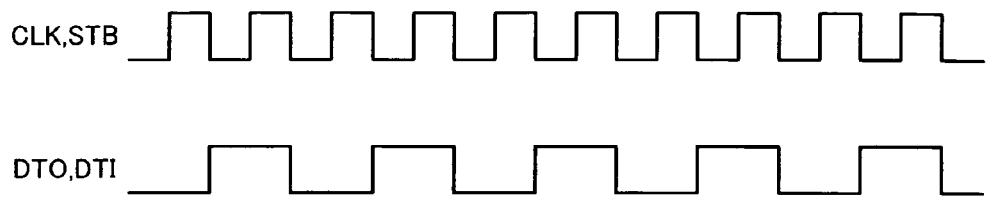
FIGS. 13A and 13B are illustrative of a method for setting or canceling a clock-transfer power-down mode.

However, as shown in FIG. 13A, the frequency (band) of the signals transmitted through the CLK+/− and STB+/− differential signal lines is higher than the frequency of the signals transmitted through the DTO+/− and DTI+/− differential signal lines. Therefore, if the power-down detection circuit, the power-down setting circuit, and the voltage driver described in this embodiment are provided on the side of the CLK+/− and STB+/− differential signal lines, transfer performance such as the transfer rate and transfer reliability may be adversely affected. In particular, if the voltage driver is provided on the side of the CLK+/− and STB+/− differential signal lines, the parasitic capacitance of the drain terminal or the gate terminal of the transistor may be added to the differential signal lines, whereby the transfer performance may be adversely affected.

Figure 13B:
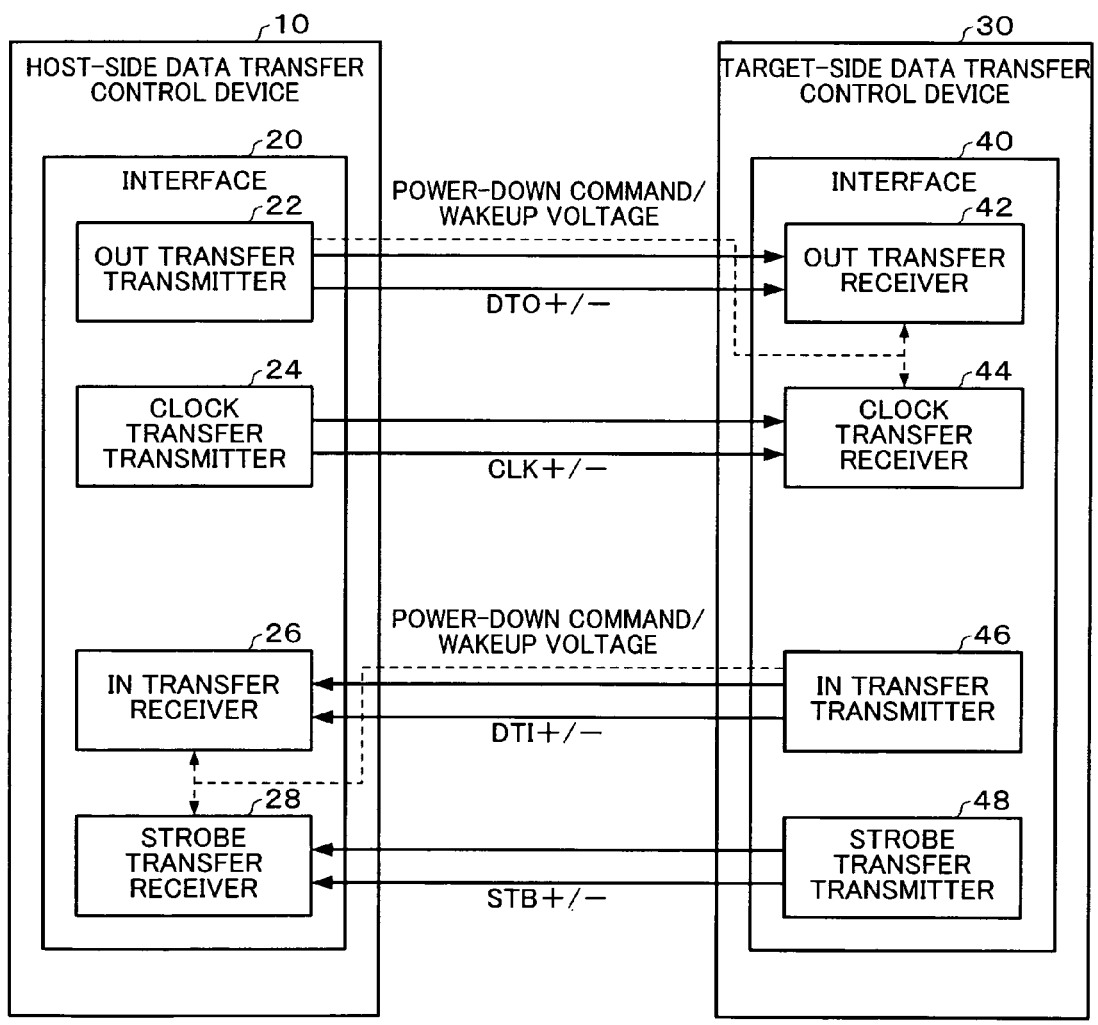

Therefore, in FIG. 13B, the power-down command for setting the clock-transfer receiver circuit 44 to the power-down mode (hereinafter called "clock-transfer power-down command") and the wakeup voltage for canceling the power-down mode (hereinafter called "clock-transfer wakeup voltage") are transmitted through the OUT-transfer DTO+/− differential signal lines.

Specifically, when setting the clock-transfer receiver circuit 44 to the power-down mode, the OUT-transfer transmitter circuit 22 transmits the clock-transfer power-down command to the OUT-transfer receiver circuit 42 through the DTO+/− differential signal lines. The power-down setting circuit included in the OUT-transfer receiver circuit 42 outputs the power-down signal to the clock-transfer receiver circuit 44 when the clock-transfer power-down command is detected as the power-down command transmitted through the DTO+/− differential signal lines. This causes the current/voltage conversion circuit and the comparator included in the clock-transfer receiver circuit 44 to be set to the power-down mode.

When canceling the power-down mode of the clock-transfer receiver circuit 44, the OUT-transfer transmitter circuit 22 (voltage driver) outputs the wakeup voltage to the DTO+/− differential signal lines. When the wakeup detection circuit included in the OUT-transfer receiver circuit 42 detects the wakeup voltage from the OUT-transfer transmitter circuit 22, the wakeup detection circuit outputs a signal for canceling the power-down mode of the OUT-transfer receiver circuit 42 and the clock-transfer receiver circuit 44.

The above-described configuration makes it unnecessary to transmit the power-down command or the wakeup voltage through the CLK+/− differential signal lines. Therefore, the transfer performance of the clock transfer performed through the CLK+/− differential signal lines can be prevented from being adversely affected.

The power-down command for setting the strobe-transfer receiver circuit 26 to the power-down mode or the wakeup voltage for canceling the power-down mode may be transferred through the IN-transfer DTI+/− differential signal lines. The power-down command for setting the clock-transfer receiver circuit to the power-down mode and the power-down command for setting the data transfer receiver circuit to the power-down mode may be commands in different codes or commands in the same code.

12. Details of Power-down Control

Figure 15:
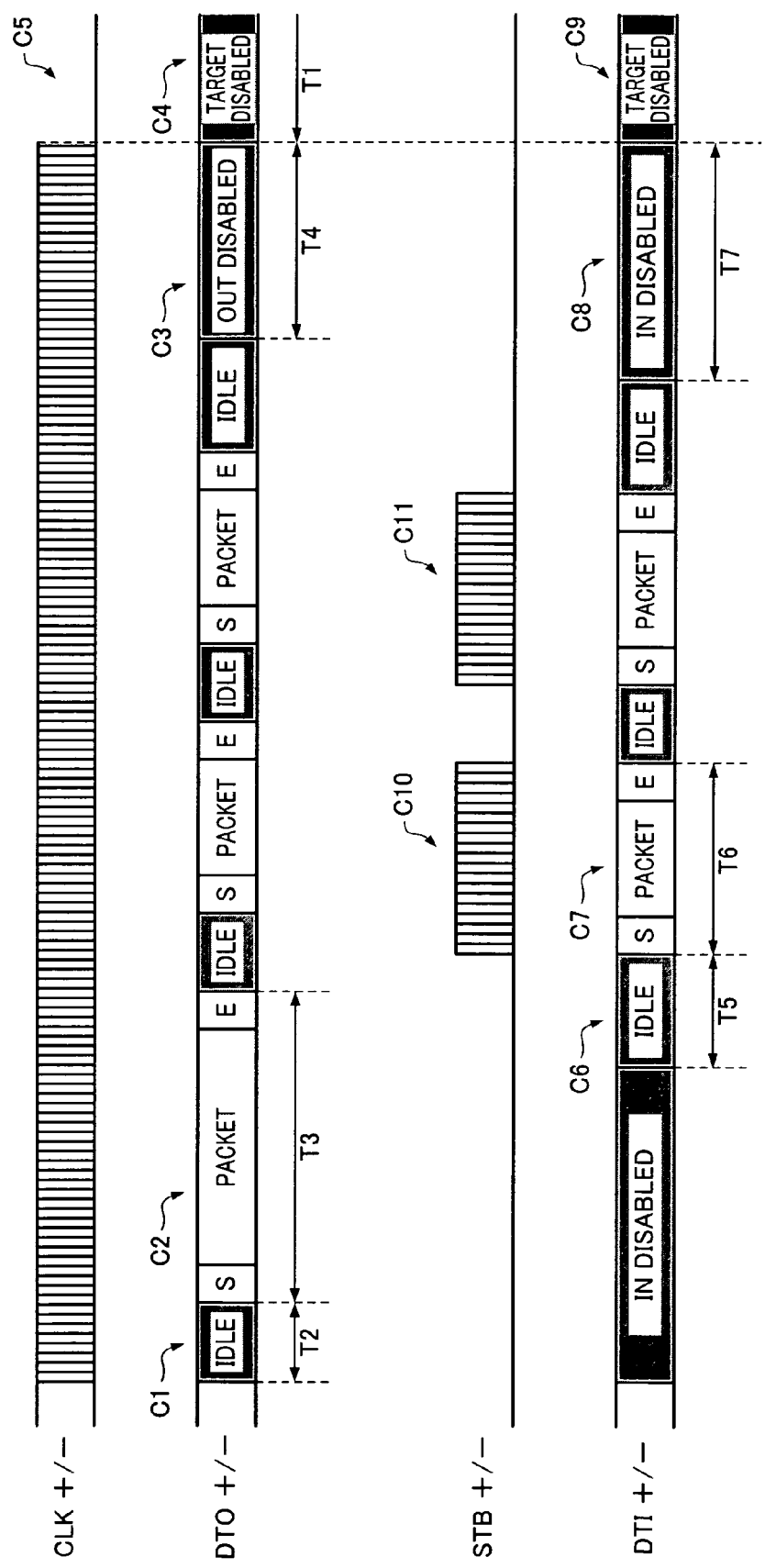
FIG. 15 is illustrative of a power-down control method in an embodiment of the present invention.

The details of the power-down control are described below. In this embodiment, various states are defined as shown in FIGS. 14 and 15. In FIGS. 14 and 15, a device disabled state is a state in which the entire electronic instrument (host-side data transfer control device and target-side data transfer control device) is set to the power-down mode. A target disabled state (period T1) is a state in which the supply of the clock signal from the host-side data transfer control device to the target-side data transfer control device stops and all the functions of the target-side data transfer control device stop. The supply of the clock signal stops after the device has entered the target disabled state.

An OUT idle state (period T2) is the idle state of the OUT-transfer (transfer from the host-side data transfer control device to the target-side data transfer control device) (state between packet transfers). In the OUT idle state, since the host-side transmitter circuit and the target-side receiver circuit are not set to the power-down mode, the normal transfer can be immediately performed. Since current constantly flows through these circuits, electric power is consumed. An OUT-transfer state (period T3) is a state in which the OUT-transfer is performed.

An OUT disabled state (period T4) is a state in which the OUT-transfer stops. In this state, the current which has been constantly flowing through the host-side transmitter circuit and the target-side receiver circuit is stopped by the power-down mode, whereby a reduction of power consumption is realized. The power-down mode can be canceled by allowing the host-side transmitter circuit to output the wakeup voltage to the target-side receiver circuit, whereby the transfer which has stopped can be resumed.

An IN idle state (period T5) is an idle state of the IN transfer (transfer from the target-side data transfer control device to the host-side data transfer control device). In the IN idle state, since the target-side transmitter circuit and the host-side receiver circuit are not set to the power-down mode, the normal transfer can be immediately performed. Since current constantly flows through these circuits, electric power is consumed. An IN transfer state (period T6) is a state in which the IN transfer is performed.

An IN disabled state (period T7) is a state in which the IN transfer stops. In this state, the current which has been constantly flowing through the target-side transmitter circuit and the host-side receiver circuit is stopped by the power-down mode, whereby a reduction of power consumption is realized. The power-down mode can be canceled by allowing the target-side transmitter circuit to output the wakeup voltage to the host-side receiver circuit, whereby the transfer which has stopped can be resumed.

In FIG. 14, a "host function" indicates the system function of the host, a "target CLKIN" indicates the presence or absence of the clock input to the target-side data transfer control device, and a "target function" indicates the system function of the target. A "DTO transmission" indicates the DTO+/− transmission function of the host, and a "DTI reception" indicates the DTI+/− reception function of the host. A "DTI transmission" indicates the DTI+/− transmission function of the target, and a "DTO reception" indicates the DTO+/− reception function of the target. A "CLK transmission" indicates the CLK+/− transmission function, and a "CLK reception" indicates the CLK+/− reception function. In FIG. 14, a symbol "O" indicates that these functions are in the enabled state (operating state), and a symbol "×" indicates that these functions are in the disabled state (power-down state). A symbol "−" indicates "don't care". In FIG. 15, "S" indicates the start code of packet transfer, and "E" indicates the end code of packet transfer. The start code and the end code are generated by using 8B/10B encoding, for example.

The OUT-transfer is in the idle state at C1 shown in FIG. 15, and a packet is transferred by the OUT-transfer at C2. In the OUT disabled state at C3, the host-side transmitter circuit and the target-side receiver circuit are set to the power-down mode. In the target disabled state at C4, the supply of the clock signals CLK+/− stops as indicated by C5, whereby all the functions of the target-side data transfer control device stop.

The IN transfer is in the idle state at C6 shown in FIG. 15, and a packet is transferred by the IN transfer at C7. In the IN disabled state at C8, the target-side transmitter circuit and the host-side receiver circuit are set to the power-down mode. The target disabled state occurs at C9. As indicated by C10 and C11, the target supplies the strobes STB+/− to the host only when performing the normal IN transfer.

According to this embodiment, each transmitter circuit can individually set the corresponding receiver circuit to the power-down mode or cancel the power-down mode. Therefore, the setting and cancellation of the power-down mode optimum for each state shown in FIGS. 14 and 15 can be realized, whereby a more intelligent power-down control can be realized.

13. Second Configuration Example

Figure 16:
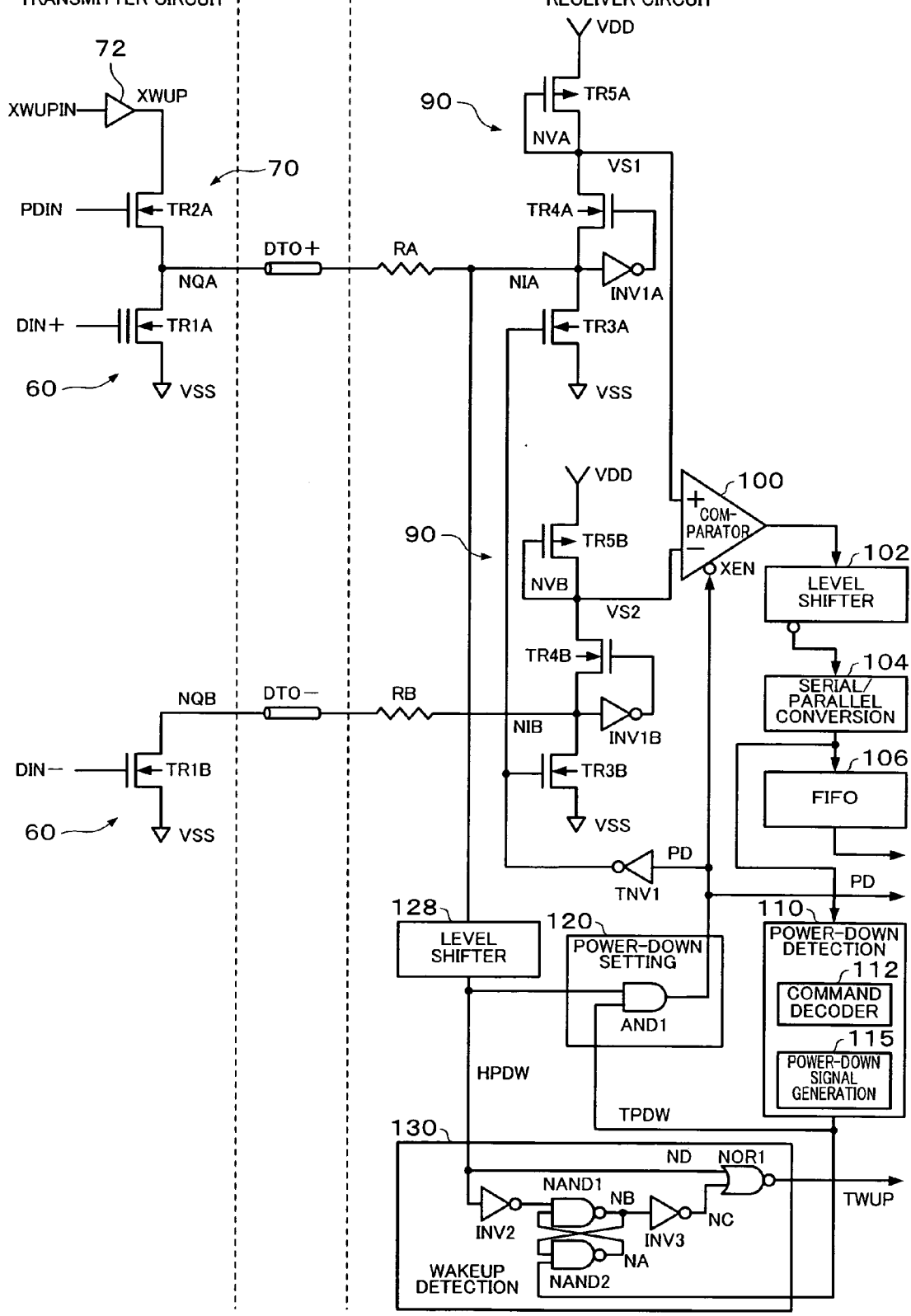
FIG. 16 is a detailed second configuration example of a transmitter circuit and a receiver circuit.

A detailed second configuration example of the transmitter circuit and the receiver circuit in this embodiment is described below using FIG. 16. In FIG. 16, the configuration and operation of the circuit block denoted by the same symbol as in FIG. 8 are almost the same as those in the first configuration example shown in FIG. 8. Therefore, description thereof is omitted.

In FIG. 16, the power-down detection circuit 110 includes the command decoder 112 and a power-down signal generation circuit 115. The command decoder 112 detects the power-down command by the decode processing. The power-down signal generation circuit 115 outputs a target side power-down signal TPDW at the H level (active) when the power-down command is detected.

When the power-down command is detected by the power-down detection circuit 110 and the transmitter circuit outputs the power-down voltage to the differential signal lines (DTO+ or DTO−), the power-down setting circuit 120 sets the current/voltage conversion circuit 90 and the comparator 100 to the power-down mode. In more detail, the power-down setting circuit 120 includes an AND circuit AND1. When the target-side power-down signal TPDW from the power-down signal generation circuit 115 and a host-side power-down signal HPDW, of which the voltage level changes corresponding to the state of the differential signal lines, are set at the H level (active), the power-down setting circuit 120 outputs the power-down signal PD at the H level (active). When the power-down signal PD is set at the H level, the comparator 100 is set to the disabled state and the transistors TR3A and TR3B are turned OFF, whereby the receiver circuit is set to the power-down mode.

The wakeup detection circuit 130 detects cancellation of the power-down mode and outputs the wakeup signal TWUP. In more detail, when the wakeup detection circuit 130 detects cancellation of the power-down mode after the receiver circuit has been set to the power-down mode by the power-down voltage output to the differential signal lines from the transmitter circuit, the wakeup detection circuit 130 outputs the wakeup signal TWUP at the H level (active). When the wakeup signal TWUP is set at the H level, the logic circuit in the subsequent stage (circuit in a layer higher than the physical layer) is awakened.

The operation in the second configuration example shown in FIG. 16 is described below using waveform diagrams shown in FIGS. 17 and 18. When the transmitter circuit transmits the power-down command to the receiver circuit as indicated by D1 shown in FIG. 17, the power-down detection circuit 110 detects the power-down command. When the power-down command is detected, the power-down signal generation circuit 115 outputs the signal TPDW at the H level as indicated by D2.

The transistor TR2A of the transmitter circuit is turned ON when the signal PDIN is set at the H level, whereby the voltage driver 70 is electrically connected with the differential signal lines. When the voltage driver 70 outputs the power-down voltage at the H level of the CMOS voltage level to the differential signal lines as indicated by D3 shown in FIG. 17, the signal HPDW is set at the H level (active) as indicated by D4. Since both the signals HPDW and TPDW are set at the H level, the power-down signal PD output from the power-down setting circuit 120 is set at the H level as indicated by D5. When the signal PD is set at the H level (active), the comparator 100 is set to the disabled state and the transistors TR3A and TR3B are turned OFF, whereby the receiver circuit is set to the power-down mode.

As described with reference to FIGS. 13A and 13B, when the signal PD is set at the H level and the data transfer receiver circuits (42, 26) are set to the power-down mode, it is preferable to set the clock-transfer receiver circuits (44, 28) to the power-down mode. When the power-down mode of the data transfer receiver circuits is canceled, it is preferable to cancel the power-down mode of the clock-transfer receiver circuits. In this case, the data transfer receiver circuit outputs the signal PD to the clock-transfer receiver circuit, and the power-down mode of the clock-transfer receiver circuit is set or cancelled based on the signal PD.

Figure 17:
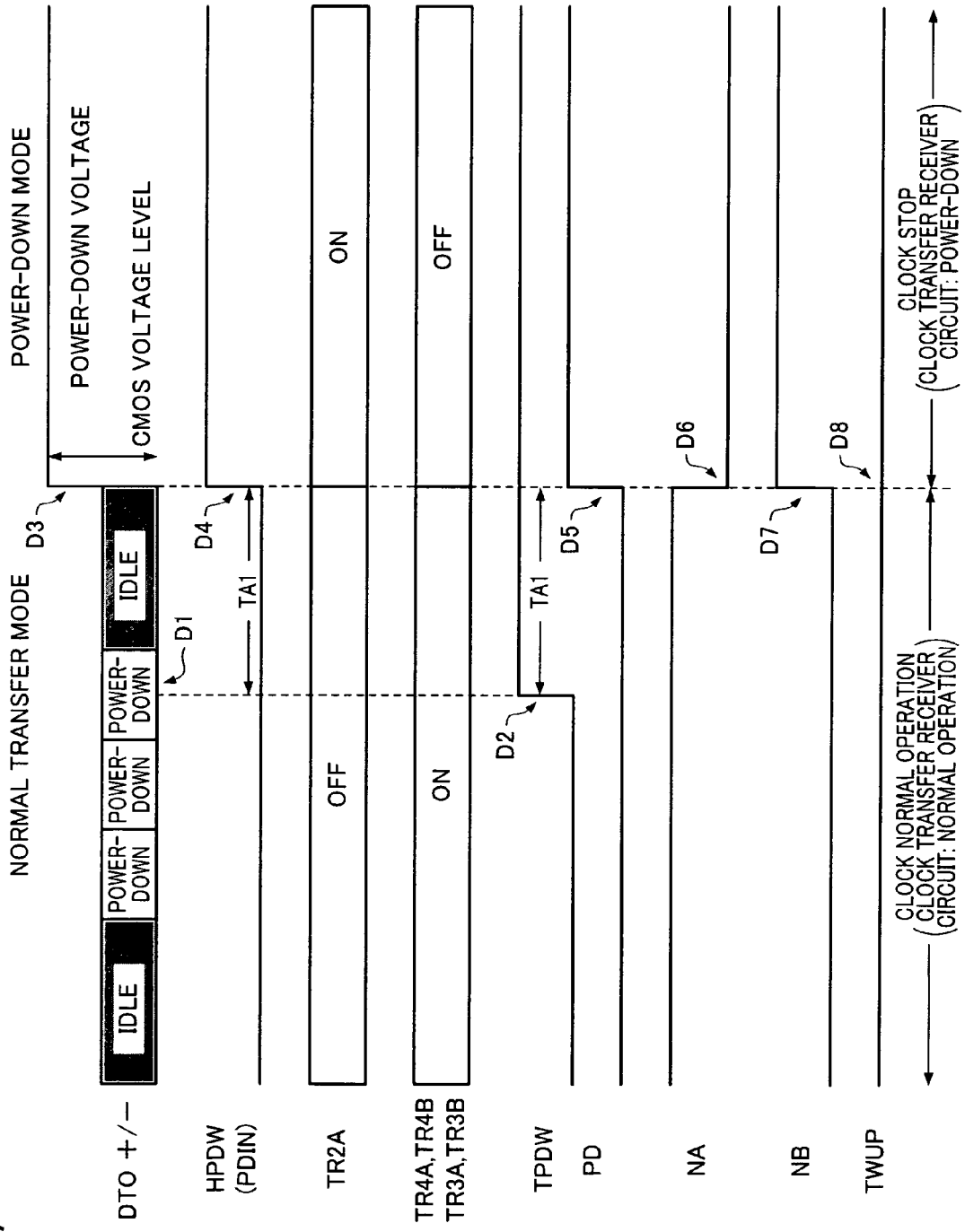
FIG. 17 is a waveform diagram illustrating an operation in the second configuration example.

When the signal HPDW is set at the H level, the output nodes NA and NB of the RS flip circuits (NAND1, NAND2) included in the wakeup detection circuit 130 are respectively set at the L level and the H level, as indicated by D6 and D7 shown in FIG. 17. In this case, since the node ND of the signal HPDW is at the H level, the wakeup signal TWUP output from the wakeup detection circuit 130 remains at the L level (inactive) as indicated by D8.

Figure 18:
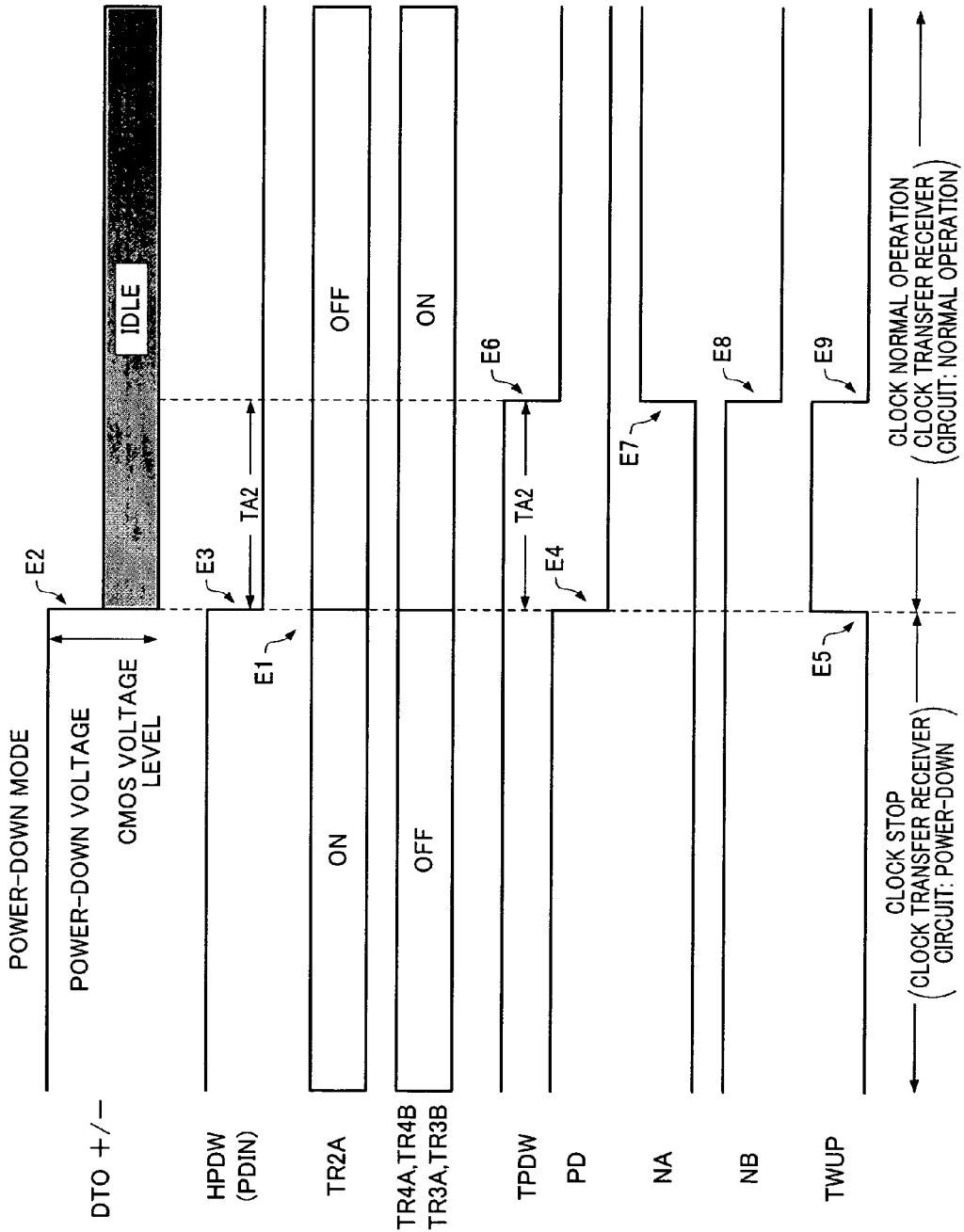
FIG. 18 is another waveform diagram illustrating an operation in the second configuration example.

The signal PDIN is then set at the L level, whereby the transistor TR2A is turned OFF as indicated by E1 shown in FIG. 18. This causes the supply of the power-down voltage to the differential signal lines to be stopped and the power-down mode to be canceled, whereby the differential signal lines are set to the idle state as indicated by E2. In the idle state, since the transistors TR1A and TR1B of the transmitter circuit are turned OFF, the voltage levels of the differential signal lines are set at a low voltage level of about 1 V, for example. Therefore, the signal HPDW is set at the L level as indicated by E3, and the power-down signal PD is set at the L level (inactive) as indicated by E4. This causes the comparator 100 to be set to the enabled state and the transistors TR3A and TR3B to be turned ON, whereby the power-down mode of the receiver circuit is canceled. As described with reference to FIGS. 13A and 13B, the power-down mode of the clock-transfer receiver circuits (44, 28) is also canceled.

The signal HPDW may be set at the L level by causing the transistors TR1A and TR1B to be turned ON after the transistor TR2A has been turned OFF. The signal HPDW may be set at the L level by causing the transistor TR2A to be turned ON for a predetermined period and allowing the voltage output circuit 72 to output a voltage at the L level in the predetermined period.

When the node ND of the signal HPDW is set at the L level, since the node NB and the node NC of the wakeup detection circuit 130 are respectively set at the H level and the L level, the wakeup signal TWUP is set at the H level as indicated by E5 shown in FIG. 18. The logic circuit in the subsequent stage (circuit in a layer higher than the physical layer) is awakened by being triggered by the wakeup signal TWUP set at the H level. When the signal TWUP is set at the H level, the power-down signal generation circuit 115 sets the signal TPDW at the L level after a predetermined period has elapsed as indicated by E6. This causes the voltages of the nodes NA and NB to be respectively set at the H level and the L level as indicated by E7 and E8, and the wakeup signal TWUP returns to the L level.

The difference between the first configuration example described with reference to FIGS. 8, 10, and 11 and the second configuration example described with reference to FIGS. 16 to 19 is described below.

In the first configuration example, the pulse signal PDPLS is set at the L level after the period TD1 has elapsed after detection of the power-down command as indicated by A5 shown in FIG. 10. This causes the signal PD to be set at the H level as indicated by A6, whereby the receiver circuit is set to the power-down mode.

In the second configuration example, when the power-down command is detected and the signal TPDW is set at the H level as indicated by D1 and D2 shown in FIG. 17, and the transmitter circuit outputs the power-down voltage at the H level to the differential signal lines as indicated by D3 and D4, the signal PD is set at the H level as indicated by D5, whereby the receiver circuit is set to the power-down mode.

Figure 11:
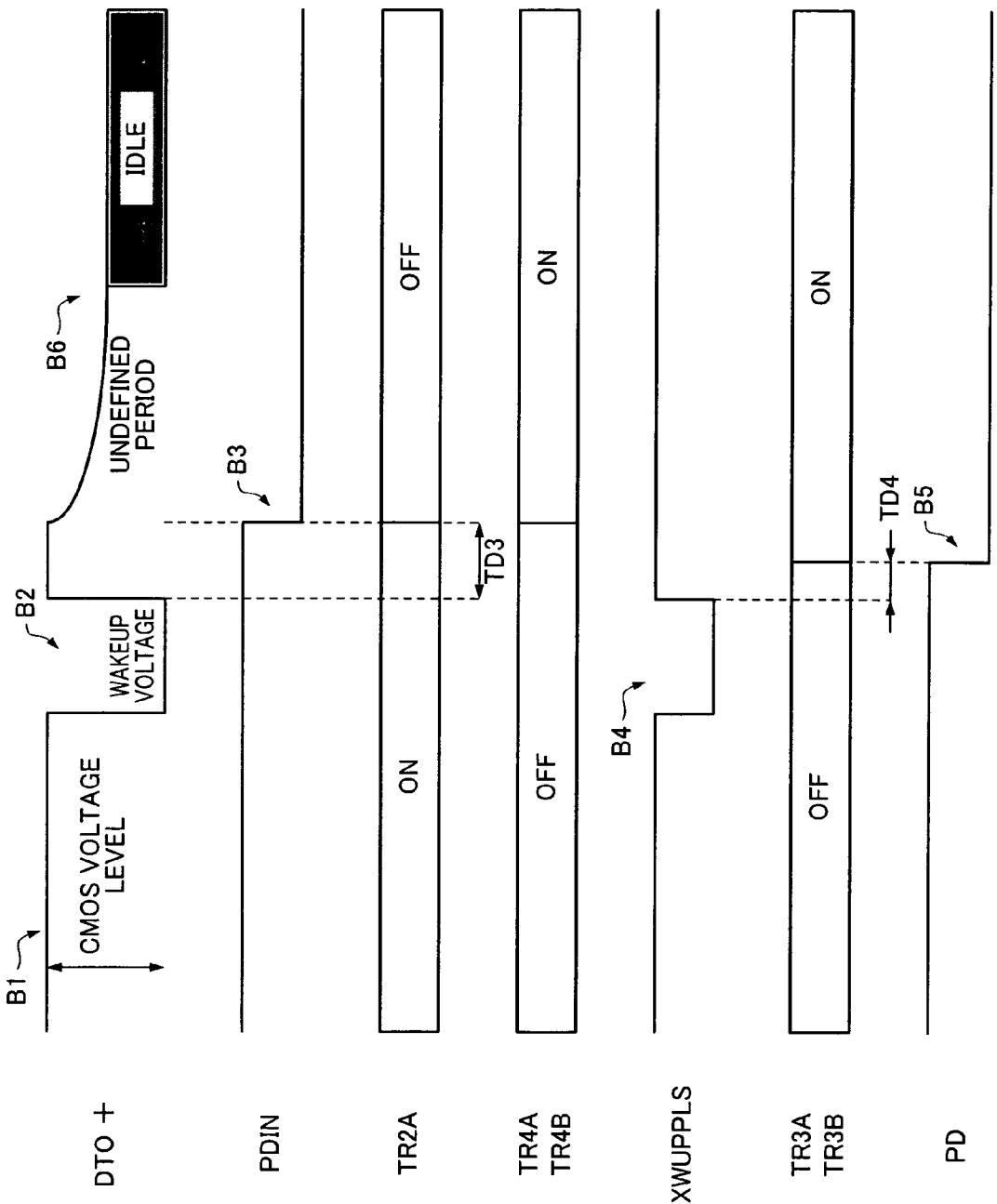
FIG. 11 is another waveform diagram illustrating an operation in the first configuration example.

In the first configuration example, when the transmitter circuit outputs the wakeup voltage at the L level as indicated by B2 shown in FIG. 11, the signal PD is set at the L level as indicated by B5, whereby the power-down mode of the receiver circuit is canceled.

In the second configuration example, when the supply of the power-down voltage to the differential signal lines by the transmitter circuit stops as indicated by E2 shown in FIG. 18, the signal PD is set at the L level as indicated by E4, whereby the power-down mode of the receiver circuit is canceled. The wakeup signal TWUP is then set at the H level as indicated by E5, whereby the higher layer logic circuit in the subsequent stage is awakened.

Specifically, in the first configuration example, the power-down mode is set merely on condition that the power-down command is detected. Therefore, the delay circuit for setting up the periods TD1 and TD2 shown in FIG. 10 is necessary.

This is because the holding circuit 122 shown in FIG. 8 is reset if the timing at which the differential signal lines is set at the H level indicated by A4 shown in FIG. 10 is later than the timing at which the pulse signal PDPLS is set at the L level indicated by A5, whereby the power-down mode is canceled. Since the transmitter circuit cannot know the signal delay state of the receiver circuit, the timing adjustment becomes complicated if such a delay circuit is provided, whereby the sequence design becomes difficult.

In the second configuration example, the power-down mode is not set even if the power-down command is merely detected as indicated by D2 shown in FIG. 17, and the power-down mode is set on condition that the transmitter circuit outputs the power-down voltage after the power-down command has been detected as indicated by D3 and D4. Specifically, preparations for transition to the power-down mode are made on condition that the power-down command is detected, and the transition to the power-down mode occurs on condition that the output of the power-down voltage is detected. This makes it unnecessary to provide a delay circuit, which is necessary in the first configuration example, whereby the timing adjustment can be simplified and the sequence design can be facilitated.

In the second configuration example, the wakeup signal TWUP must remain at the L level at the timing indicated by D8 shown in FIG. 17, and the wakeup signal TWUP must be set at the H level at the timing indicated by E8 shown in FIG. 18. However, the signal HPDW is set at the L level and the signal TPDW is set at the H level in the period TA1 shown in FIG. 17 and the period TA2 shown in FIG. 18. Specifically, the signal state is the same in the period TA1 and the period TA2. Since the clock signal stops in the period between the timing indicated by D8 shown in FIG. 17 and the timing indicated by E5 shown in FIG. 18, the period TA1 and the period TA2 must be distinguished only by the signal state.

Therefore, in the second configuration example, the wakeup detection circuit 130 having the configuration shown in FIG. 16 is provided. Specifically, in the second configuration example, the period TA1 shown in FIG. 17 and the period TA2 shown in FIG. 18 can be distinguished by allowing the RS flip-flop circuits (NAND1, NAND2) of the wakeup detection circuit 130 to hold the voltage states of the nodes NA and NB. As described above, the wakeup detection circuit 130 is a circuit which sets the wakeup signal TWUP at the H level (active) when the voltage level of the differential signal lines changes from the power-down voltage (H level, for example) to another voltage level (1 V, for example) (when the signal HPDW changes from the H level to the L level) after the power-down command has been detected and the output signal TPDW from the power-down detection circuit 110 has been set at the H level (active). This circuit prevents the wakeup signal TWUP from being set at the H level at the timing indicated by D8 shown in FIG. 17 and causes the wakeup signal TWUP to be set at the H level at the timing indicated by E5 shown in FIG. 18.

14. Third Configuration Example

Figure 19:
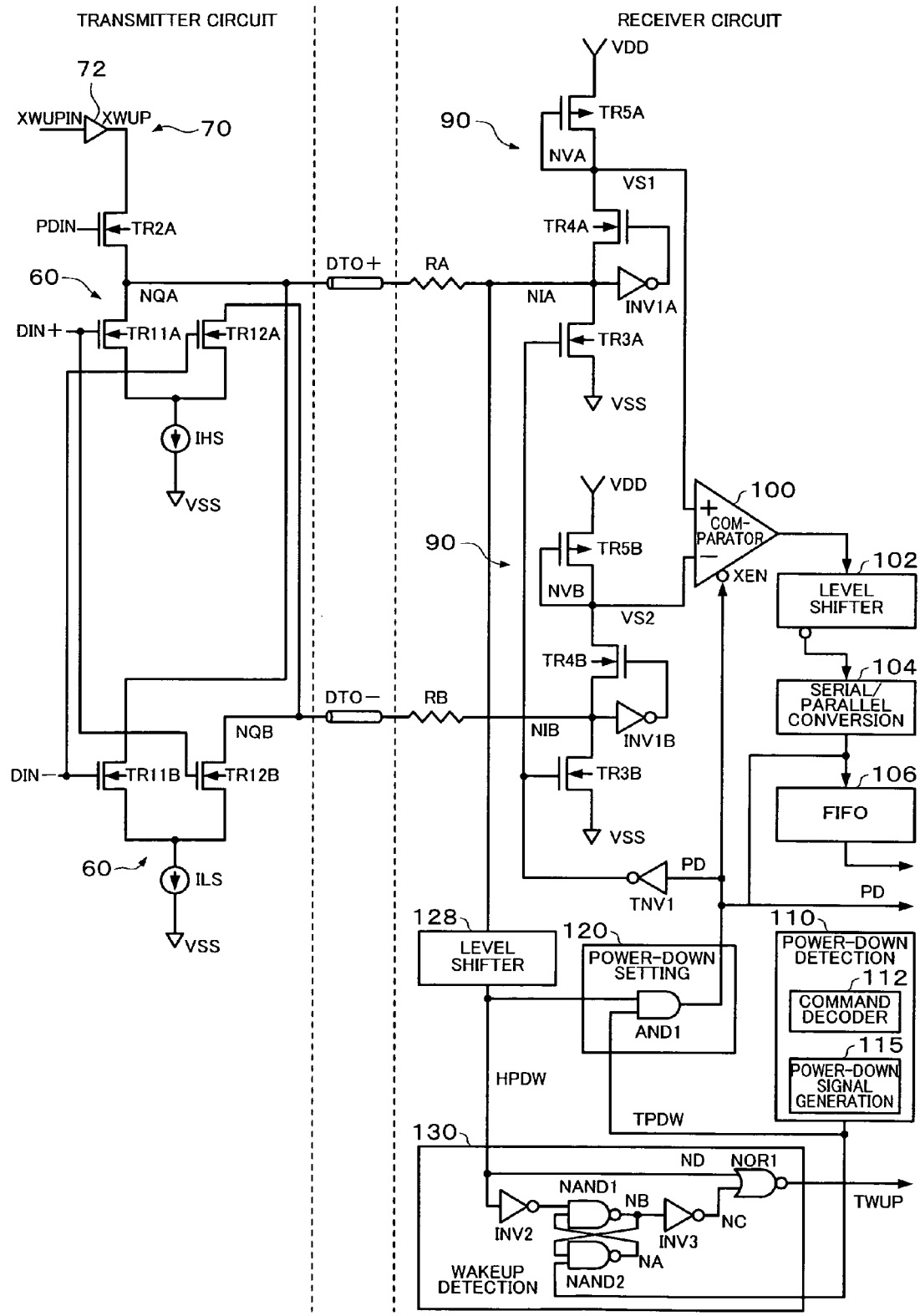
FIG. 19 is a detailed third configuration example of a transmitter circuit and a receiver circuit.

A detailed third configuration example of the transmitter circuit and the receiver circuit in this embodiment is described below using FIG. 19. In FIG. 19, the configuration and operation of the circuit block denoted by the same symbol as in FIGS. 8 and 16 are almost the same as those in the first and second configuration examples shown in FIGS. 8 and 16. Therefore, description thereof is omitted.

The third configuration example shown in FIG. 19 differs from the second configuration example shown in FIG. 16 in the configuration of the transmitter circuit. In more detail, in FIG. 19, the current driver 60 (first and second current sources) of the transmitter circuit includes N-type (first conductivity type) transistors TR11A and TR12A and a current source IHS. The current driver 60 includes N-type (first conductivity type) transistors TR11B and TR12B and a current source ILS.

The transistor TR11A is provided between the output node NQA and the current source IHS. In more detail, the input signal DIN+ is input to a gate terminal of the transistor TR11A, the output node NQA is connected with a drain terminal of the transistor TR11A, and the current source IHS is connected with a source terminal of the transistor TR11A. The transistor TR12A is provided between the output node NQB and the current source IHS. In more detail, the input signal DIN− is input to a gate terminal of the transistor TR12A, the output node NQB is connected with a drain terminal of the transistor TR12A, and the current source IHS is connected with a source terminal of the transistor TR12A.

The transistor TR11B is provided between the output node NQA and the current source ILS. In more detail, the input signal DIN− is input to a gate terminal of the transistor TR11B, the output node NQA is connected with a drain terminal of the transistor TR11B, and the current source ILS is connected with a source terminal of the transistor TR11B. The transistor TR12B is provided between the output node NQB and the current source ILS. In more detail, the input signal DIN− is input to a gate terminal of the transistor TR12B, the output node NQB is connected with a drain terminal of the transistor TR12B, and the current source ILS is connected with a source terminal of the transistor TR12B.

The current source IHS is provided between the transistors TR11A and TR12A and the power supply VSS (first power supply). The current source IHS is a current source which can generate current (500 µA, for example) greater than that of the current source ILS, and may be formed by a transistor to which a first reference voltage is input at a gate terminal, for example.

The current source ILS is provided between the transistors TR11B and TR12B and the power supply VSS (first power supply). The current source ILS is a current source which can generate current (100 µA, for example) smaller than that of the current source IHS, and may be formed by a transistor to which a second reference voltage lower than the first reference voltage is input at a gate terminal, for example.

When the input signal DIN+ becomes active (H level) and the input signal DIN− becomes inactive (L level), the transistors TR11A and TR12B are turned ON and the transistors TR12A and TR11B are turned OFF. This causes a large amount of current (500 µA, for example) to flow through the DTO+ signal line and a small amount of current (100 µA, for example) to flow through the DTO− signal line. When the input signal DIN+ becomes inactive (L level) and the input signal DIN− becomes active (H level), the transistors TR11A and TR12B are turned OFF and the transistors TR12A and TR11B are turned ON. This causes a small amount of current to flow through the DTO+ signal line and a large amount of current to flow through the DTO− signal line.

Figure 20A:
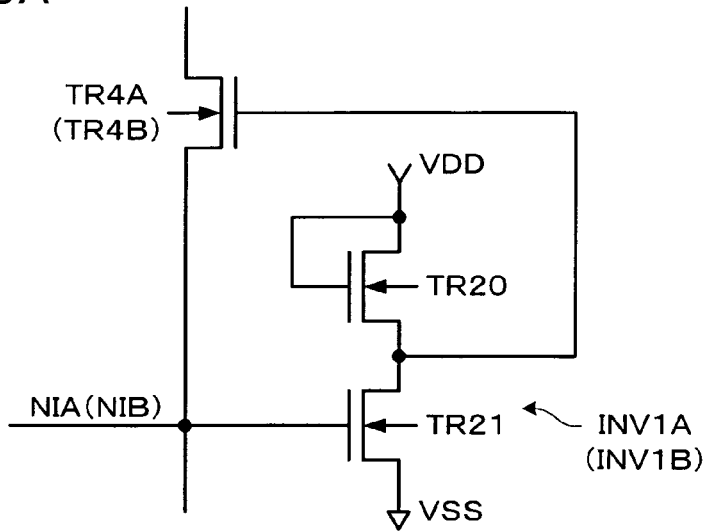
FIGS. 20A, 20B, and 20C are detailed examples of an inverter circuit.
Figure 20B:
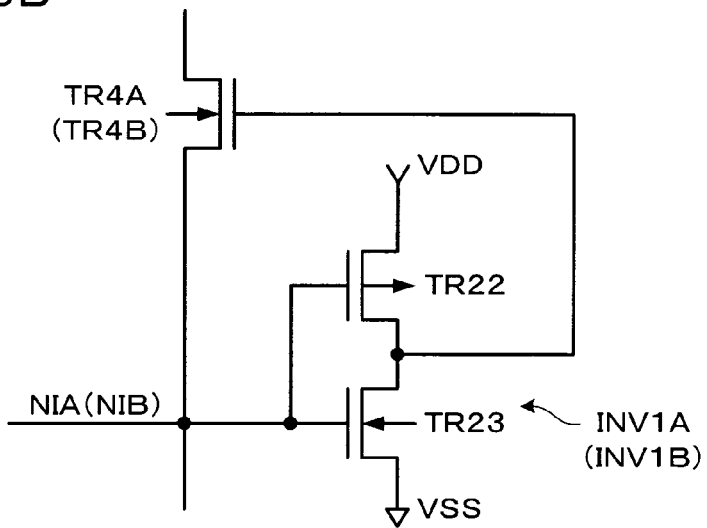
Figure 20C:
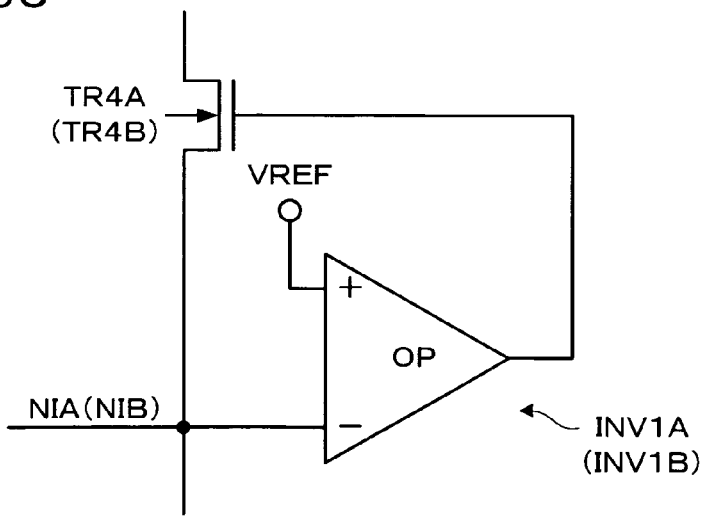

FIGS. 20A, 20B, and 20C show specific examples of the inverter circuits (inversion circuits) INV1A and INV1B. In FIG. 20A, the inverter circuit INV1A (INV1B) is formed by N-type (first conductivity type) transistors TR20 and TR21 connected in series between the power supply VDD and the power supply VSS. The power supply VDD (second power supply) is connected with a gate terminal of the transistor TR20, and the input node NIA (NIB) is connected with a gate terminal of the transistor TR21. A load resistor may be used instead of the transistor TR20. In FIG. 20B, the inverter circuit INV1A (INV1B) is formed by a P-type (second conductivity type) transistor TR22 and an N-type (first conductivity type) transistor TR23 connected in series between the power supply VDD and the power supply VSS. The input node NIA (NIB) is connected with gate terminals of the transistors TR22 and TR23. In FIG. 20C, the inverter circuit INV1A (INV1B) is formed by an operational amplifier OP. A reference voltage VREF is input to a first input (negative side) of the operational amplifier OP, and the input node NIA (NIB) is connected with a second input (negative side) of the operational amplifier OP.

In FIGS. 8, 16, and 19, the circuit formed by the transistor TR4A (TR4B) and the inverter circuit INV1A (INV1B) functions as a low-impedance generation circuit. A specific impedance (Z0) of the DTO+ (DTO−) differential signal lines can be matched with the input impedance of the receiver circuit by complementing the impedance (Z2) of the resistor RA (RB) to the impedance (Z1) generated by the low-impedance generation circuit (Z0=Z1+Z2). The length of the differential signal lines or the like is changed depending on the type of an electronic instrument, whereby the specific impedance of the differential signal lines may be changed. In this case, it is preferable that the resistor RA (RB) be a variable resistor. This enables the circuit formed by the low-impedance generation circuit (circuit consisting of the transistor TR4A and the inverter circuit INV1A or the circuit consisting of the transistor TR4B and the inverter circuit INV1B) and the resistor RA (RB) to function as an impedance adjustment circuit. Therefore, impedance matching can be performed even if the specific impedance of the differential signal lines is changed. The resistor RA (RB) may not be provided when the specific impedance of the differential signal lines is low and impedance matching can be performed only by the input impedance of the low-impedance generation circuit, for example.

15. Electronic Instrument

Figure 21:
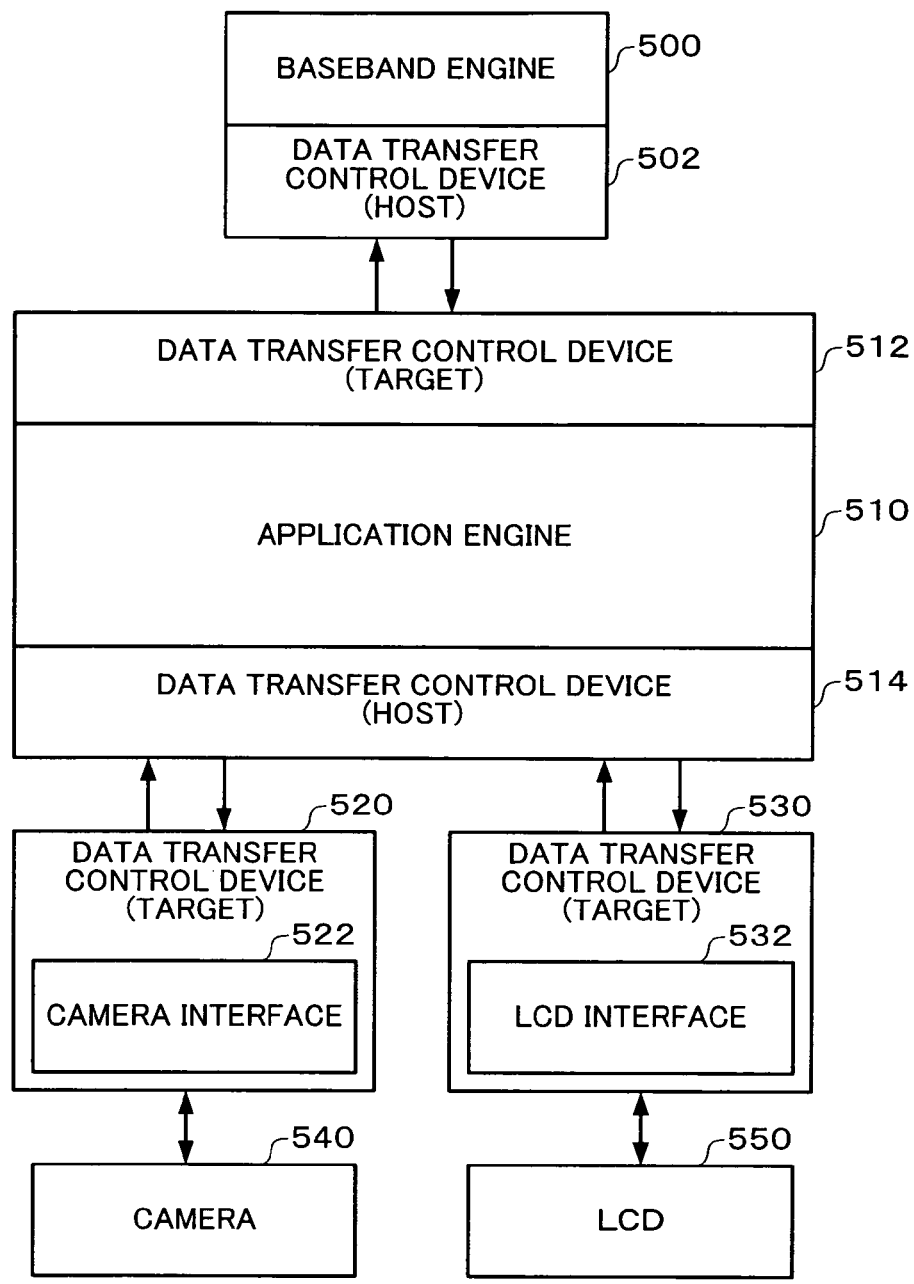
FIG. 21 is a configuration example of an electronic instrument.

FIG. 21 shows a configuration example of an electronic instrument in this embodiment. The electronic instrument includes data transfer control devices 502, 512, 514, 520, and 530 described in this embodiment. The electronic instrument includes a baseband engine 500 (communication device in a broad sense), an application engine 510 (processor in a broad sense), a camera 540 (imaging device in a broad sense), and an LCD 550 (display device in a broad sense). In other words, the electronic instrument shown in FIG. 21 includes the target-side data transfer control devices 520 and 530, the host-side data transfer control device 514 connected with the target-side data transfer control devices 520 and 530 through a serial bus, and one or more devices 540 and 550 connected with the target-side data transfer control devices 520 and 530 through an interface bus. The electronic instrument may have a configuration in which some of these sections are omitted. According to this configuration, a portable telephone or the like having a camera function and a display function of a liquid crystal display (LCD) can be realized. However, the electronic instrument in this embodiment is not limited to the portable telephone, and may be applied to various electronic instruments such as a digital camera, PDA, electronic notebook, electronic dictionary, or portable information terminal.

As shown in FIG. 21, the serial transfer described in this embodiment is performed between the host-side data transfer control device 502 provided to the baseband engine 500 and the target-side data-transfer-control-device 512 provided to the application engine 510 (graphic engine). The serial transfer described in this embodiment is also performed between the host-side data transfer control device 514 provided to the application engine 510 and the data transfer control device 520 including a camera interface circuit 522 or the data transfer control device 530 including an LCD interface circuit 532.

According to the configuration shown in FIG. 21, EMI noise can be reduced in comparison with a conventional electronic instrument. Moreover, power consumption of the electronic instrument can be further reduced by realizing a reduction of scale and power consumption of the data transfer control device. In the case where the electronic instrument is a portable telephone, a serial signal line can be used as a signal line which passes through a connection section (hinge section) of the portable telephone, whereby mounting can be facilitated.

The present invention is not limited to the above-described embodiments. Various modifications and variations are possible. Any term (such as N-type, P-type, VSS, VDD, host-side data transfer control device and target-side data transfer control device, strobe, IN transfer and OUT transfer, baseband engine, application engine, camera, LCD, differential signal lines, or PLL circuit) cited with a different term having broader or the same meaning (such as first conductivity type, second conductivity type, first power supply, second power supply, device, clock signal, data transfer, communication device, processor, imaging device, display device, serial signal line, or clock generation circuit) at least once in this specification and drawings can be replaced by the different term in any place in this specification and drawings.

What is claimed is:

1. A host-side data transfer control device which performs data transfer with a target-side data transfer control device, the host-side data transfer control device comprising:
   an OUT-transfer transmitter circuit which is connected with an OUT-transfer receiver circuit of the target-side data transfer control device through an OUT-transfer serial signal line, and transmits OUT data by driving the OUT-transfer serial signal line;
   a clock-transfer transmitter circuit which is connected with a clock-transfer receiver circuit of the target-side data transfer control device through a clock-transfer serial signal line, and transmits a clock signal, which is used to sample the OUT data and is used to generate a system clock signal of the target-side data transfer control device, by driving the clock-transfer serial signal line; and
   a power-down setting circuit for setting a power-down mode which includes a first power-down mode and a second power down mode,
   wherein, in the first power-down mode, the power-down setting circuit sets the OUT-transfer transmitter circuit to the power-down mode and sets the clock-transfer transmitter circuit to the power-down mode to stop the system clock signal of the target-side data transfer control device, and, in the second power-down mode, the power-down setting circuit sets the OUT-transfer transmitter circuit to the power-down mode without setting the clock-transfer transmitter circuit to the power-down mode.

2. The host-side data transfer control device as defined in claim 1, comprising:
   an IN-transfer receiver circuit which is connected with an IN-transfer transmitter circuit of the target-side data transfer control device through an IN-transfer serial signal line, and receives IN data; and
   a strobe-transfer receiver circuit which is connected with a strobe-transfer transmitter circuit of the target-side data transfer control device through a strobe-transfer serial signal line, and receives a strobe for sampling the IN data,
   wherein, in the first power-down mode, the power-down setting circuit sets the OUT-transfer transmitter circuit, the clock-transfer transmitter circuit, the IN-transfer receiver circuit, and the strobe-transfer receiver circuit to the power-down mode, and, in the second power-down mode, the power-down setting circuit sets the OUT-transfer transmitter circuit, the IN-transfer receiver circuit, and the strobe-transfer receiver circuit to the power-down mode without setting the clock-transfer transmitter circuit to the power-down mode.

3. The host-side data transfer control device as defined in claim 2,
   wherein the strobe-transfer receiver circuit receives the strobe from the strobe-transfer transmitter circuit of the target-side data transfer control device, the strobe being generated by the target-side data transfer control device based on the clock signal transmitted by the clock-transfer transmitter circuit.

4. The host-side data transfer control device as defined in claim 1, comprising:
   an IN-transfer receiver circuit which is connected with an IN-transfer transmitter circuit of the target-side data transfer control device through an IN-transfer serial signal line, and receives IN data; and
   a strobe-transfer receiver circuit which is connected with a strobe-transfer transmitter circuit of the target-side data transfer control device through a strobe-transfer serial signal line, and receives a strobe for sampling the IN data,
   wherein the power-down mode includes a third power-down mode, and in the third power-down mode, the power-down setting circuit sets the IN-transfer receiver circuit and the strobe-transfer receiver circuit to the power-down mode without setting the OUT-transfer transmitter circuit and the clock-transfer transmitter circuit to the power-down mode.

5. The host-side data transfer control device as defined in claim 4,
   wherein the strobe-transfer receiver circuit receives the strobe from the strobe-transfer transmitter circuit of the target-side data transfer control device, the strobe being generated by the target-side data transfer control device based on the clock signal transmitted by the clock-transfer transmitter circuit.

6. The host-side data transfer control device as defined in claim 1,
   wherein at least one of the OUT-transfer transmitter circuit and the clock-transfer transmitter circuit transmits a power-down command to a receiver which is one of the OUT-transfer receiver circuit and the clock-transfer receiver circuit of the target-side data transfer control device for setting the receiver to the power-down mode by current-driving a serial signal line which is one of the OUT-transfer serial signal line and the clock-transfer serial signal line using a current driver in a normal transfer mode.

7. The host-side data transfer control device as defined in claim 6,
   wherein the OUT-transfer transmitter circuit transmits the power-down command for setting the OUT-transfer receiver circuit and the clock-transfer receiver circuit of the target-side data transfer control device to the power-down mode by current-driving the OUT-transfer serial signal line using the current driver in the normal transfer mode.

8. The host-side data transfer control device as defined in claim 6,
wherein at least one of the OUT-transfer transmitter circuit and the clock-transfer transmitter circuit transmits a special code as the power-down command, the special code being obtained by using an encoding method which expands a bit width.

9. The host-side data transfer control device as defined in claim 1,
wherein at least one of the OUT-transfer transmitter circuit and the clock-transfer transmitter circuit includes a current driver and a voltage driver, the current driver current-driving a serial signal line which is one of the OUT-transfer serial signal line and the clock-transfer serial signal line, the voltage driver electrically disconnecting from the serial signal line in a normal transfer mode, and the voltage driver electrically connecting with the serial signal line and voltage-driving the serial signal line in the power-down mode, and
wherein the voltage driver outputs a power-down voltage or a wakeup voltage to the serial signal line, the power-down voltage being used for setting a receiver which is one of the OUT-transfer receiver circuit and the clock-transfer receiver circuit of the target-side data transfer control device to the power-down mode, and the wakeup voltage being used for canceling the power-down mode of the receiver circuit.

10. An electronic instrument comprising:
the host-side data transfer control device as defined in claim 1; and
at least one of a communication device, a processor, an imaging device, and a display device.

11. An electronic instrument comprising:
the host-side data transfer control device as defined in claim 2; and
at least one of a communication device, a processor, an imaging device, and a display device.

12. An electronic instrument comprising:
the host-side data transfer control device as defined in claim 4; and
at least one of a communication device, a processor, an imaging device, and a display device.

13. An electronic instrument comprising:
the host-side data transfer control device as defined in claim 6; and
at least one of a communication device, a processor, an imaging device, and a display device.

* * * * *